United States Patent
Hommi et al.

(10) Patent No.: US 7,230,393 B2
(45) Date of Patent: Jun. 12, 2007

(54) MOTOR CONTROL APPARATUS AND MOTOR CONTROL METHOD

(75) Inventors: Akira Hommi, Aichi-ken (JP); Kiyotaka Hamajima, Okazaki (JP); Mitsuhiro Nada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 7 days.

(21) Appl. No.: 10/525,791

(22) PCT Filed: Jul. 7, 2003

(86) PCT No.: PCT/JP03/08593

§ 371 (c)(1),
(2), (4) Date: Feb. 25, 2005

(87) PCT Pub. No.: WO2004/022381

PCT Pub. Date: Mar. 18, 2004

(65) Prior Publication Data

US 2006/0145644 A1    Jul. 6, 2006

(30) Foreign Application Priority Data

Aug. 29, 2002  (JP) .............................. 2002-251363

(51) Int. Cl.
*B61C 15/08* (2006.01)
*B61C 15/12* (2006.01)
*H02P 5/00* (2006.01)
*H02P 5/46* (2006.01)

(52) U.S. Cl. ............................ 318/52; 318/53; 318/54; 318/55; 318/56; 318/57; 318/93; 318/432; 318/434

(58) Field of Classification Search ............ 318/52–57, 318/68, 93, 430–434, 700, 800, 88
See application file for complete search history.

(56) References Cited

U.S. PATENT DOCUMENTS 4,799,161 A    1/1989    Hirotsu et al.

(Continued)

FOREIGN PATENT DOCUMENTS

EP    1-147-937 A2    10/2001

OTHER PUBLICATIONS

Japanese language version of Japanese Office Action No. JP-2002-251363, issued jan. 20, 2006.

(Continued)

*Primary Examiner*—Lincoln Donovan
*Assistant Examiner*—Tyrone Smith
(74) *Attorney, Agent, or Firm*—Kenyon & Kenyon LLP

(57) ABSTRACT

In response to detection of a skid of drive wheels based on an increase in angular acceleration α of a rotating shaft of a motor, the control procedure of the invention refers to a map representing a variation in maximum torque Tmax against the angular acceleration α and sets torque restriction of the motor to limit the torque level of the motor to the maximum torque Tmax corresponding to a peak value of the angular acceleration α. When the torque restriction sufficiently lowers the angular acceleration α to detect convergence of the skid, the control procedure cancels the torque restriction to a certain level of the maximum torque Tmax corresponding to a torque restoration limit δ1, which is set according to the degree of the skid. The torque restoration limit δ1 (that is, the maximum torque Tmax) is cancelled in a stepwise manner by a cancellation rate and a cancellation time corresponding to an additional accelerator depression relative to an accelerator opening at the time of detection of the skid. The control procedure sets the greater cancellation rate and the shorter cancellation time with an increase in additional accelerator depression.

16 Claims, 22 Drawing Sheets

U.S. PATENT DOCUMENTS

| | | | |
|---|---|---|---|
| 4,811,993 A * | 3/1989 | Matsumoto et al. | 303/166 |
| 4,849,890 A * | 7/1989 | Inoue et al. | 701/80 |
| 4,926,333 A | 5/1990 | Hashiguchi et al. | |
| 5,195,037 A * | 3/1993 | Tezuka | 701/81 |
| 5,362,287 A | 11/1994 | Tanaka et al. | |
| 5,508,924 A | 4/1996 | Yamashita | |
| 5,511,866 A * | 4/1996 | Terada et al. | 303/152 |
| 5,570,935 A * | 11/1996 | Monzaki | 303/155 |
| 5,951,122 A * | 9/1999 | Murphy | 303/163 |
| 6,178,370 B1 * | 1/2001 | Zierolf | 701/71 |
| 6,473,683 B1 * | 10/2002 | Nada | 701/82 |

FOREIGN PATENT DOCUMENTS

| | | | |
|---|---|---|---|
| EP | 1147937 A2 * | 10/2006 | |
| JP | 1-271619 | 10/1989 | |
| JP | 02-038150 | 2/1990 | |
| JP | 5-202951 | 8/1993 | |
| JP | 08-049572 | 2/1996 | |
| JP | 09-228870 | 9/1997 | |
| JP | 10-304514 | * 11/1998 | |
| JP | 2000-238549 | 9/2000 | |
| JP | 2001-295676 | 10/2001 | |
| JP | 2001-330123 | 11/2001 | |
| JP | 1541406 A1 * | 6/2005 | |
| JP | 1547854 A1 * | 6/2005 | |
| JP | 1548253 A1 * | 6/2005 | |

OTHER PUBLICATIONS

English partial translation of Japanese Office Action No. JP-2002-251363, issued Jan. 20, 2006.

European Search Report for Appln. No. 03741238.4-2207, issued May 8, 2006.

* cited by examiner

MOTOR CONTROL APPARATUS AND MOTOR CONTROL METHOD

This is a 371 national phase application of PCT/JP2003/008593 filled 7 Jul. 2003, claiming priority to Japanese Patent Application No. 2002-251363 filed 29 Aug. 2002, the contents of which are incorporated herein by reference.

TECHNICAL FIELD

The present invention relates to a motor control apparatus and a motor control method. More specifically the invention pertains to a motor control apparatus that controls a motor, which is mounted on a vehicle and outputs power to a drive shaft linked to drive wheels, as well as to a corresponding motor control method.

BACKGROUND ART

One proposed motor control apparatus restricts torque output from a motor to a drive shaft, in response to occurrence of a skid due to wheelspin of drive wheels with the torque output from the motor (see, for example, Japanese Patent Laid-Open Gazette No. 10-304514). This motor control apparatus restricts the torque level output from the motor in response to detection of a skid based on an increase in angular acceleration of the drive wheels (that is, a time variation of angular velocity), while canceling the torque restriction of the motor in response to elimination of the skid by the torque restriction.

This prior art motor control apparatus uniformly cancels the torque restriction, regardless of the driver's demand. This may cause the driver to feel uncomfortable and worsen the drivability.

The applicant of the present invention has disclosed a vehicle skid control technique that regulates a degree of torque restriction, which is set in response to occurrence of a skid, according to an accelerator opening or a driver's step-on amount of an accelerator pedal and regulates a degree of cancellation of the torque restriction in response to elimination of the skid (see Japanese Patent Laid-Open Gazette No. 2001-295676).

DISCLOSURE OF THE INVENTION

The motor control apparatus and the corresponding motor control method of the invention aim to enhance drivability in skid control of a vehicle. The motor control apparatus and the corresponding motor control method of the invention also aim to prevent an excessive skid of a vehicle while reflecting a driver's acceleration demand in skid control of the vehicle.

At least part of the above and the other related objects is attained by the motor control apparatus and the corresponding motor control method of the invention having the arrangements discussed below.

A motor control apparatus of the invention controls a motor, which is mounted on a vehicle and outputs power to a drive shaft linked to drive wheels, and includes: a skid detection module that detects a skid due to wheelspin of the drive wheels; a torque restriction control module that, in response to detection of a skid by the skid detection module, sets torque restriction for reduction of the skid and controls the motor under the torque restriction; and a torque restriction cancellation control module that, in response to at least a reducing tendency of the skid, cancels the torque restriction, which is set by the torque restriction control module, to a specific degree corresponding to a variation in driver's accelerator operation, and controls the motor under at least partly cancelled torque restriction.

The motor control apparatus of the invention detects a skid due to wheelspin of the drive wheels, sets torque restriction for reducing the skid in response to detection of a skid, and controls the motor under the torque restriction. In response to at least a reducing tendency of the skid, the motor control apparatus cancels the torque restriction to a specific degree corresponding to a variation in driver's accelerator operation, and controls the motor under at least partly cancelled torque restriction. The cancellation of the torque restriction in response to the reducing tendency of the skid reflects the variation in driver's accelerator operation, that is, the driver's acceleration demand of the vehicle under the condition of occurrence of a skid. This arrangement desirably enhances the drivability in cancellation of the torque restriction, compared with a prior art arrangement that does not reflect the driver's acceleration demand in cancellation of the torque restriction.

In the motor control apparatus of the invention, the variation in driver's accelerator operation may represent a rate of change relative to a reference accelerator operation at a time of detection of a skid by the skid detection module. This arrangement adequately understands the driver's acceleration demand of the vehicle under the condition of occurrence of a skid.

In the motor control apparatus of the invention, the torque restriction cancellation control module may cancel the torque restriction in a stepwise manner with elapse of time. This arrangement desirably lowers the potential for reoccurrence of a skid by cancellation of the torque restriction. In this embodiment of the motor control apparatus, the torque restriction cancellation control module may control the motor with a tendency of increasing a cancellation rate of the torque restriction with an increase in driver's additional depression of an accelerator pedal as the variation in driver's accelerator operation. This arrangement cancels the torque restriction by a greater cancellation rate corresponding to the driver's acceleration demand. Further, in this embodiment of the motor control apparatus, the torque restriction cancellation control module may control the motor with a tendency of shortening a cancellation time of the torque restriction with an increase in driver's additional depression of an accelerator pedal as the variation in driver's accelerator operation. This arrangement cancels the torque restriction within a shorter cancellation time corresponding to the driver's acceleration demand.

The motor control apparatus of the invention may further include: an angular acceleration measurement module that measures an angular acceleration of either of the drive shaft and a rotating shaft of the motor, and in this embodiment, the skid detection module may detect a skid, based on a variation in measured angular acceleration, and the torque restriction control module, in response to detection of a skid, may change a degree of the torque restriction corresponding to the angular acceleration measured by the angular acceleration measurement module and controls the motor under the changed degree of the torque restriction. This arrangement effectively sets the torque restriction according to the degree of the skid, which is based on the angular acceleration, so as to reduce the skid.

In the motor control apparatus of the invention, the vehicle may have driven wheels that are driven by the drive wheels, and the motor control apparatus may further include: a drive wheel rotation speed measurement module that measures a rotation speed of the drive wheels; and a driven wheel rotation speed measurement module that measures a rotation speed of the driven wheels. In this embodiment, the skid detection module may detect a skid, based on a rotation speed difference between the rotation speed of the drive wheels measured by the drive wheel rotation speed measurement module and the rotation speed of the driven wheels measured by the driven wheel rotation speed measurement module, and the torque restriction control module, in response to detection of a skid, may change a degree of the torque restriction corresponding to the rotation speed difference and control the motor under the changed degree of the torque restriction. This arrangement effectively sets the torque restriction according to the degree of the skid, which is based on the rotation speed difference between the rotation speed of the drive wheels and the rotation speed of the driven wheels, so as to reduce the skid.

In the motor control apparatus of the invention, the motor control apparatus may further include: a torque re-restriction control module that, in response to detection of another skid by the skid detection module under control of the motor by the torque restriction cancellation control module, sets torque re-restriction for reduction of the another skid and controls the motor under the torque re-restriction. This arrangement effectively reduces another skid occurring under cancellation of the torque restriction corresponding to the variation in driver's accelerator operation. The motor control apparatus of the invention structured in this way may further include: an angular acceleration measurement module that measures an angular acceleration of either of the drive shaft and a rotating shaft of the motor, and in this embodiment, the skid detection module may detect a skid, based on a variation in measured angular acceleration, and the torque re-restriction control module, in response to detection of another skid by the skid detection module, may change a degree of the torque re-restriction corresponding to a peak value of the angular acceleration measured by the angular acceleration measurement module and control the motor under the changed degree of the torque re-restriction. This arrangement effectively re-restricts the torque according to the degree of another skid, which is based on the peak value of the angular acceleration. The motor control apparatus of the invention may further include: a torque restriction re-cancellation control module that cancels the torque re-restriction set by the torque re-restriction control module after elapse of a preset time period corresponding to a variation in driver's accelerator opening, regardless of state of the another skid, and controls the motor under the cancelled torque re-restriction. This arrangement responds to the driver's acceleration demand of the vehicle, while desirably preventing an excess amount of another skid.

A motor control method of the invention controls a motor, which is mounted on a vehicle and outputs power to a drive shaft linked to drive wheels, and the motor control method include the steps of: (a) detecting a skid due to wheelspin of the drive wheels; (b) in response to detection of a skid by the step (a), setting torque restriction for reduction of the skid and controlling the motor under the torque restriction; and (c) in response to at least a reducing tendency of the skid, canceling the torque restriction, which is set by the step (b), to a specific degree corresponding to a variation in driver's accelerator operation, and controlling the motor under at least partly cancelled torque restriction.

In the motor control method of the invention, the variation in driver's accelerator operation may represent a rate of change relative to a reference accelerator operation at a time of detection of a skid by the step (a).

Further, in the motor control method of the invention, the step (c) may cancel the torque restriction in a stepwise manner with elapse of time. In this embodiment of the motor control method, the step (c) may control the motor with a tendency of increasing a cancellation rate of the torque restriction with an increase in driver's additional depression of an accelerator pedal as the variation in driver's accelerator operation. Moreover, in the motor control method of the invention, the step (c) may control the motor with a tendency of shortening a cancellation time of the torque restriction with an increase in driver's additional depression of an accelerator pedal as the variation in driver's accelerator operation.

The technique of the invention is not restricted to the motor control apparatus or the corresponding motor control method discussed above, but may also be actualized by a vehicle equipped with a motor and the motor control apparatus of the invention.

BEST MODES OF CARRYING OUT THE INVENTION

Figure 1:
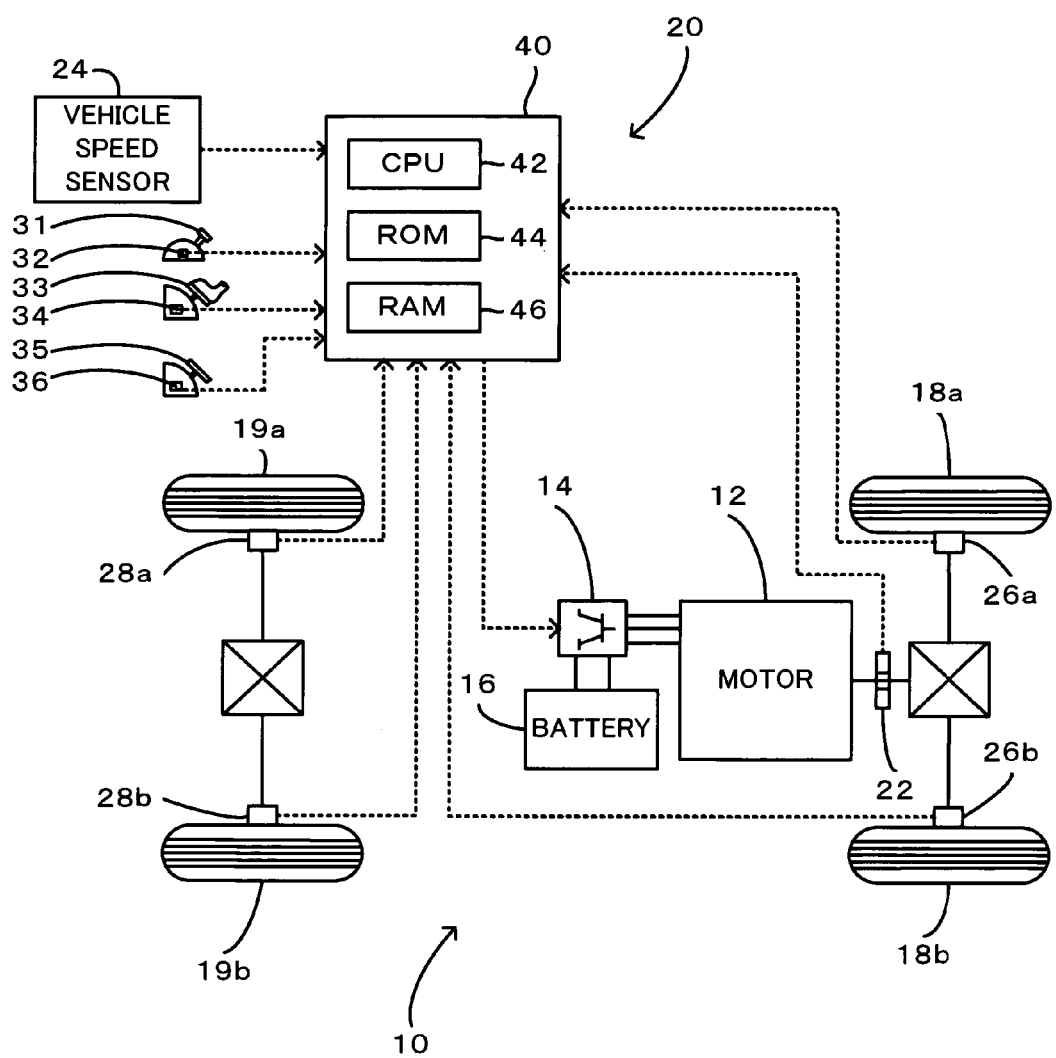
FIG. 1 schematically illustrates the configuration of an electric vehicle 10 equipped with a motor control apparatus 20 in one embodiment of the invention.

Some modes of carrying out the invention are described below as preferred embodiments. FIG. 1 schematically illustrates the configuration of an electric vehicle 10 equipped with a motor control apparatus 20 in one embodiment of the invention. As illustrated, the motor control apparatus 20 of the embodiment is constructed to drive and control a motor 12, which uses electric power supplied from a battery 16 via an inverter circuit 14 and outputs power to a drive shaft linked to drive wheels 18a, 18b of the electric vehicle 10. The motor control apparatus 20 includes a rotation angle sensor 22 that measures a rotation angle θ of a rotating shaft of the motor 12, a vehicle speed sensor 24 that measures a driving speed of the vehicle 10, wheel speed sensors 26a, 26b, 28a, and 28b that respectively measure wheel speeds of the drive wheels (front wheels) 18a and 18b and driven wheels (rear wheels) 19a and 19b driven by the drive wheels 18a and 18b, diversity of sensors that detect the driver's various operations (for example, a gearshift position sensor 32 that detects the driver'setting position of a gearshift lever 31, an accelerator pedal position sensor 34 that detects the driver's step-on amount of an accelerator pedal 33 (an accelerator opening), and a brake pedal position sensor 36 that detects the driver's step-on amount of a brake pedal 35 (a brake opening)), and an electronic control unit 40 that controls the respective constituents of the apparatus.

The motor 12 is, for example, a known synchronous motor generator that functions both as a motor and a generator. The inverter circuit 14 includes multiple switching elements that convert a supply of electric power from the battery 16 into another form of electric power suitable for actuation of the motor 12. The structures of the motor 12 and the inverter circuit 14 are well known in the art and are not the key part of this invention, thus not being described here in detail.

The electronic control unit 40 is constructed as a microprocessor including a CPU 42, a ROM 44 that stores processing programs, a RAM 46 that temporarily stores data, and input and output ports (not shown). The electronic control unit 40 receives, via the input port, the rotation angle θ of the rotating shaft of the motor 12 measured by the rotation angle sensor 22, the vehicle speed V of the vehicle 10 measured by the vehicle speed sensor 24, the wheel speeds Vf1 and Vf2 of the drive wheels 18a and 18b and the wheel speeds Vr1 and Vr2 of the driven wheels 19a and 19b measured by the wheel speed sensors 26a, 26b, 28a, and 28b, the gearshift position detected by the gearshift position sensor 32, the accelerator opening Acc detected by the accelerator pedal position sensor 34, and the brake opening detected by the brake pedal position sensor 36. The electronic control unit 40 outputs control signals, for example, switching control signals to the switching elements of the inverter circuit 14 to drive and control the motor 12, via the output port.

Figure 2:
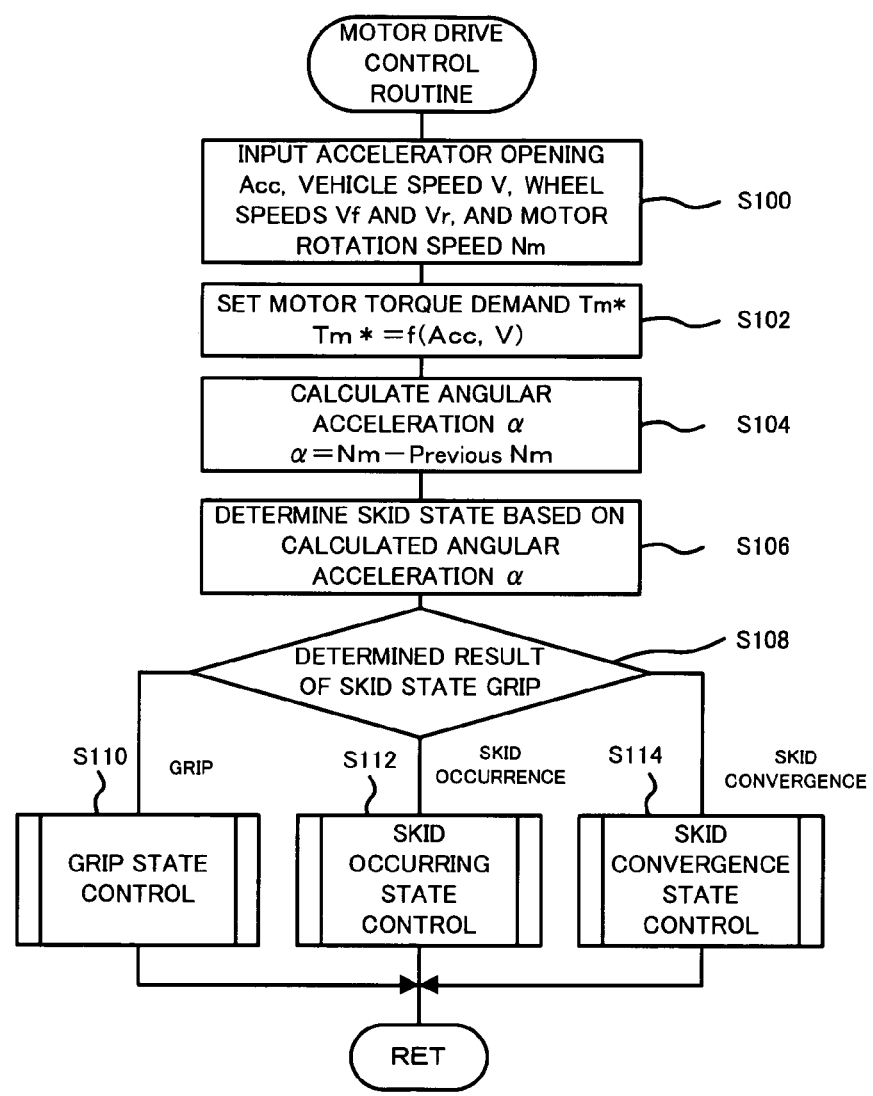
FIG. 2 is a flowchart showing a motor drive control routine executed by an electronic control unit 40 in the motor control apparatus 20 of the embodiment.

The description regards the operations of the motor control apparatus 20 constructed as discussed above, especially a series of operations of driving and controlling the motor 12 in the event of occurrence of a skid due to wheelspin of the drive wheels 18a and 18b of the vehicle 10. FIG. 2 is a flowchart showing a motor drive control routine executed by the electronic control unit 40 in the motor control apparatus 20 of the embodiment. This control routine is repeatedly executed at preset time intervals (for example, at every 8 msec).

When the motor drive control routine starts, the CPU 42 of the electronic control unit 40 first inputs the accelerator opening Acc from the accelerator pedal position sensor 34, the vehicle speed V from the vehicle speed sensor 24, wheel speeds Vf and Vr from the wheel speed sensors 26a, 26b, 28a, and 28b, and a motor rotation speed Nm calculated from the rotation angle θ measured by the rotation angle sensor 22 (step S100). In this embodiment, the wheel speeds Vf and Vr respectively represent an average of the wheel speeds Vf1 and Vf2 measured by the wheel speed sensors 26a and 26b and an average of the wheel speeds Vr1 and Vr2 measured by the wheel speed sensors 28a and 28b. The vehicle speed V is measured by the vehicle speed sensor 24 in this embodiment, but may alternatively be calculated from the wheel speeds Vf1, Vf2, Vr1, and Vr2 measured by the wheel speed sensors 26a, 26b, 28a, and 28b.

Figure 3:
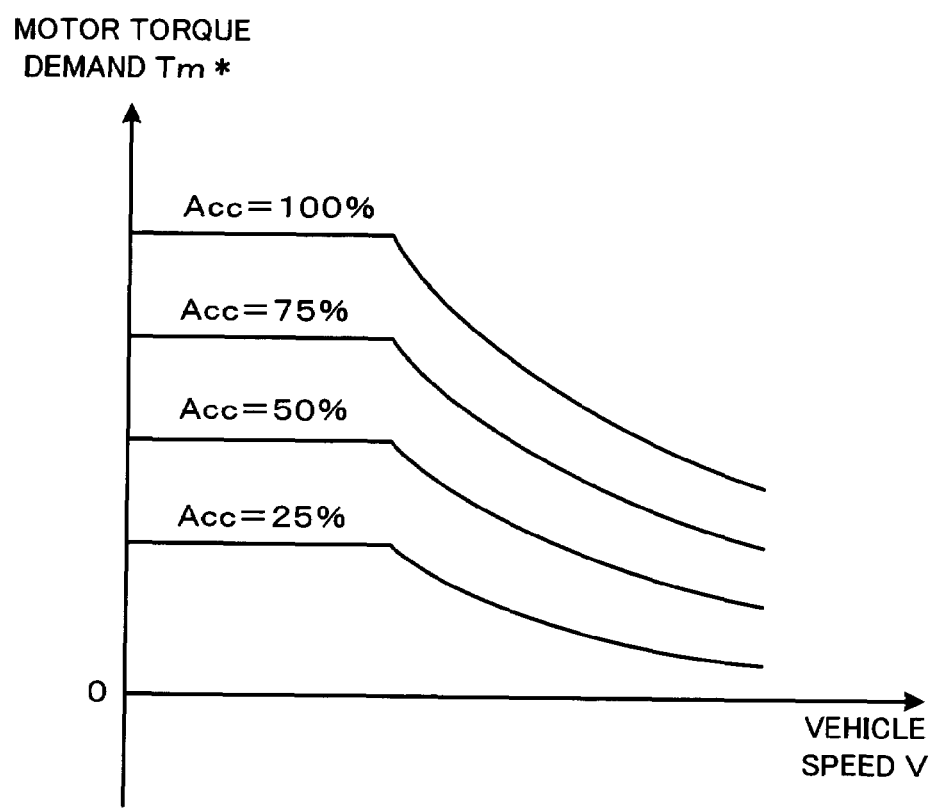
FIG. 3 is a map showing variations in motor toque demand Tm* against vehicle speed V and accelerator opening Acc.

The CPU 42 then sets a torque demand Tm* of the motor 12 according to the input accelerator opening Acc and the input vehicle speed V (step S102). A concrete procedure of setting the motor torque demand Tm* in this embodiment stores in advance variations in motor torque demand Tm* against the accelerator opening Acc and the vehicle speed V as a map in the ROM 44 and reads the motor torque demand Tm* corresponding to the given accelerator opening Acc and the given vehicle speed V from the map. One example of this map is shown in FIG. 3.

The CPU 42 subsequently calculates an angular acceleration α from the motor rotation speed Nm input at step S100 (step S104). The calculation of the angular acceleration α in this embodiment subtracts a previous rotation speed Nm input in a previous cycle of this routine from a current rotation speed Nm input in the current cycle of this routine (current rotation speed Nm—previous rotation speed Nm). The unit of the angular acceleration α is [rpm/8 msec] since the execution interval of this routine is 8 msec in this embodiment, where the rotation speed Nm is expressed by the number of rotations per minute [rpm]. Any other suitable unit may be adopted for the angular acceleration α as long as the angular acceleration α is expressible as a time variation of rotation speed. In order to minimize a potential error, the angular acceleration α may be an average of angular accelerations calculated in a preset number of cycles of this routine (for example, 3).

The CPU 42 determines a skid state of the drive wheels 18a and 18b based on the calculated angular acceleration α (step S106), and executes a required series of control according to the result of the determination (steps S110 to S114), before terminating this motor drive control routine. The determination of no occurrence of a skid (when both a skid occurrence flag F1 and a skid convergence flag F2 described below are set equal to 0) triggers grip-state control (step S110). The determination of the occurrence of a skid (when the flag F1 is set equal to 1 and the flag F2 is set equal to 0) triggers skid occurring state control (step S112). The determination of convergence of a skid (when both the flags F1 and F2 are set equal to 1) triggers skid convergence state control (step S114).

Figure 4:
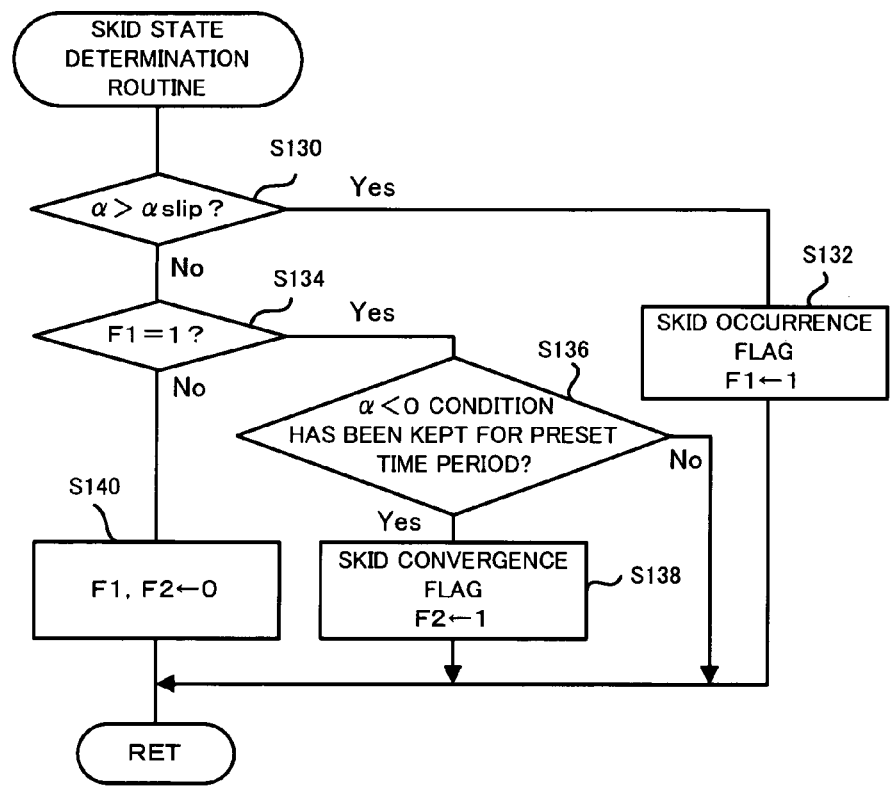
FIG. 4 is a flowchart showing a skid state determination routine executed by the electronic control unit 40 in the motor control apparatus 20 of the embodiment.

The determination of the skid state follows a skid state determination routine shown in FIG. 4. When the skid state determination routine starts, the CPU 42 of the electronic control unit 40 compares the angular acceleration α calculated at step S104 in the control routine of FIG. 2 with a preset threshold value αslip, which suggests the occurrence of a skid due to wheelspin (step S130). When the calculated angular acceleration α exceeds the preset threshold value αslip, the CPU 42 determines the occurrence of a skid on the wheels 18a and 18b and sets the value '1' to a skid occurrence flag F1 representing the occurrence of a skid (step S132), before exiting from this skid state determination routine. When the calculated angular acceleration α does not exceed the preset threshold value αslip, on the other hand, the CPU 42 determines whether the skid occurrence flag F1 is equal to 1 (step S134). When the skid occurrence flag F1 is equal to 1, the CPU 42 subsequently determines whether the calculated angular acceleration α has been kept negative for a preset time period (step S136). In the case of an affirmative answer, the CPU 42 determines convergence of the skid occurring on the drive wheels 18a and 18b and sets the value '1' to a skid convergence flag F2 (step S138), before exiting from this skid state determination routine. In the case of a negative answer, on the other hand, the CPU 42 determines no convergence of the skid and terminates this skid state determination routine. When the calculated angular acceleration α does not exceed the preset threshold value αslip and the skid occurrence flag F1 is not equal to 1, the CPU 42 sets both the skid occurrence flag F1 and the skid convergence flag F2 equal to 0 (step S140) and terminates this skid state determination routine. The respective controls of the motor 12 according to the values of the skid occurrence flag F1 and the skid convergence flag F2 are described in detail below.

The grip state control is normal drive control of the motor 12 and drives and control the motor 12 to ensure output of a torque corresponding to the preset torque demand Tm*.

Figure 5:
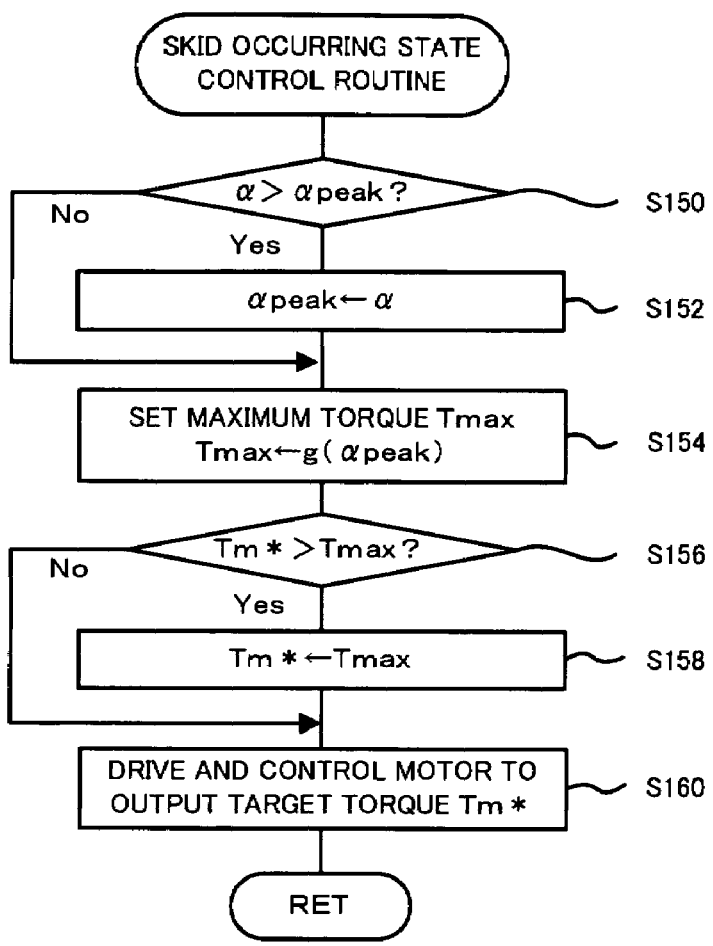
FIG. 5 is a flowchart showing a skid occurring state control routine executed by the electronic control unit 40 in the motor control apparatus 20 of the embodiment.
Figure 6:
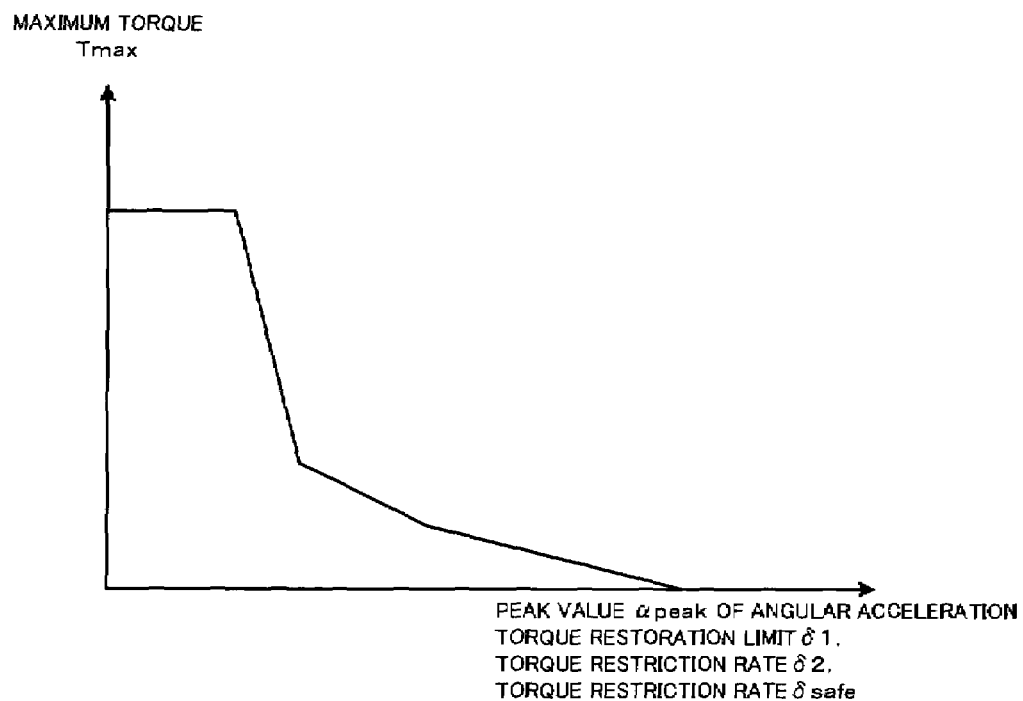
FIG. 6 is a map showing a variation in maximum torque Tmax against angular acceleration $\alpha$ of a motor 12.

The skid occurring state control drives and controls the motor 12 to lower the angular acceleration α, which was increased by the occurrence of a skid, and follows a skid occurring state control routine of FIG. 5. The CPU 42 of the electronic control unit 40 first compares the angular acceleration α with a preset peak value αpeak (step S150). When the angular acceleration α exceeds the preset peak value αpeak, the peak value αpeak is updated to the current value of the angular acceleration α (step S152). The peak value αpeak represents a peak of the angular acceleration α increasing due to a skid and is initially set equal to 0. Until the angular acceleration α increases to reach its maximum, the peak value αpeak is successively updated to the current value of the angular acceleration α. When the increasing angular acceleration α reaches its maximum, the maximum value of the increasing angular acceleration α is fixed to the peak value αpeak. After setting the peak value αpeak, the CPU 42 sets a maximum torque Tmax as an upper limit of torque output from the motor 12 corresponding to the peak value αpeak (step S154). The procedure of this embodiment refers to a map shown in FIG. 6 to set the maximum torque Tmax. FIG. 6 shows a variation in maximum torque Tmax against the angular acceleration α. As illustrated in this map, the maximum torque Tmax decreases with an increase in angular acceleration α. The greater peak value αpeak with an increase in angular acceleration α, that is, the heavier skid, sets the smaller value to the maximum torque Tmax and limits the output torque of the motor 12 to the smaller maximum torque Tmax.

After setting the maximum torque Tmax, the motor torque demand Tm* is compared with the maximum torque Tmax (step S156). When the motor torque demand Tm* exceeds the maximum torque Tmax, the motor torque demand Tm* is limited to the maximum torque Tmax (step S158). The CPU 42 then sets the motor torque demand Tm* to a target torque and drives and controls the motor 12 to output a torque corresponding to the target torque Tm* (step S160), before exiting from this skid occurring state control routine. The torque output from the motor 12 in the occurrence of a skid is limited to a lower level (that is, the maximum torque Tmax corresponding to the peak value αpeak of the angular acceleration in the map of FIG. 6) for immediate reduction of the skid. This limitation effectively reduces the skid.

The skid convergence state control drives and controls the motor 12 to restore the limited torque level, when the torque restriction by the skid occurring state control lowers the angular acceleration α and converges the skid. The skid convergence state control follows a skid convergence state control routine of FIG. 7. The CPU 42 of the electronic control unit 40 first inputs a torque restoration limit δ1 and a torque restriction rate δsafe (both expressed in the same unit [rpm/8 msec] as the angular acceleration) (step S170).

Figure 8:
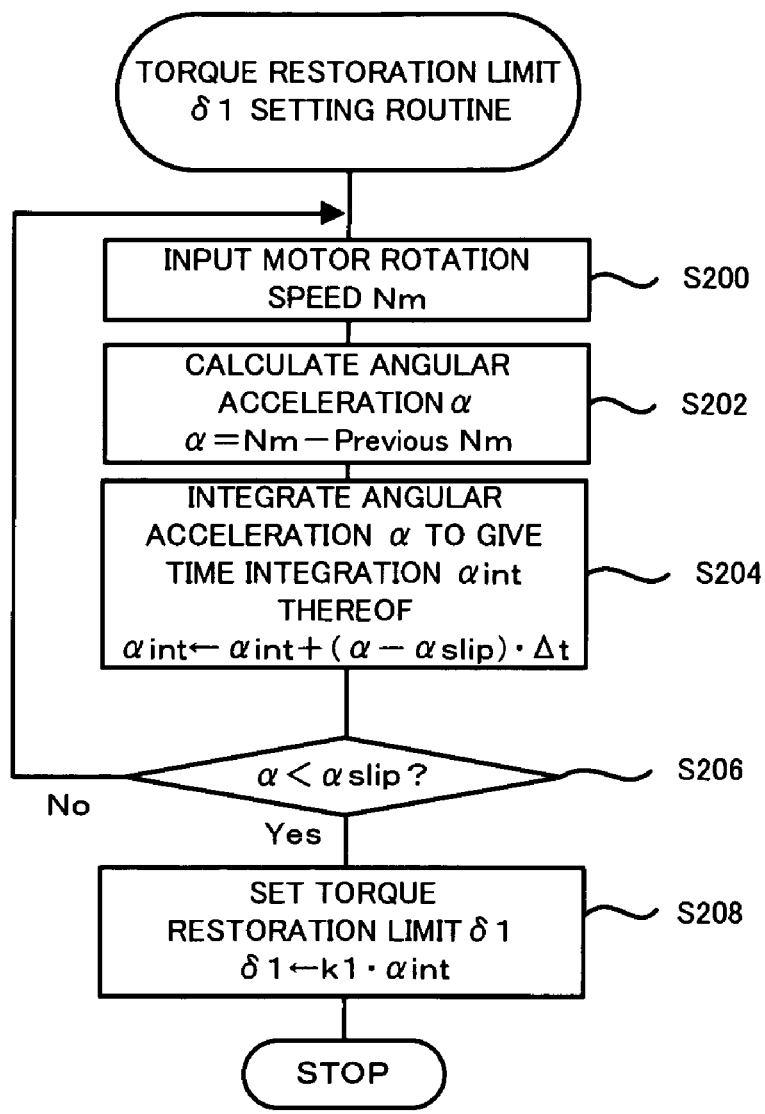
FIG. 8 is a flowchart showing a torque restoration limit $\delta 1$ setting routine executed by the electronic control unit 40 in the motor control apparatus 20 of the embodiment.

The torque restoration limit δ1 is a parameter used to set a degree of restoration from the torque restriction by increasing the maximum torque Tmax, which has been set in the skid occurring state control described above. The initial value of the torque restoration limit δ1 is set equal to 0. The torque restoration limit δ1 is set according to a torque restoration limit δ1 setting routine shown in FIG. 8 as discussed below. The torque restoration limit δ1 setting routine of FIG. 8 is executed when the skid occurrence flag F1 is set from 0 to 1 (that is, when the calculated angular acceleration α exceeds the preset threshold value αslip) at step S132 in the skid state determination routine of FIG. 4. The CPU 42 of the electronic control unit 40 first inputs the motor rotation speed Nm calculated from the rotation angle θ measured by the rotation angle sensor 22 (step S200) and calculates the angular acceleration α of the motor 12 from the input motor rotation speed Nm (step S202). The CPU 42 then integrates the angular acceleration α to give a time integration αint thereof over an integration interval since the angular acceleration α exceeded the preset threshold value αslip (step S204). In this embodiment, the time integration αint of the angular acceleration α is given by Equation (1) below, where Δt denotes a time interval of the repeated execution of steps S200 to S204 as described below and is set equal to 8 msec in this embodiment:

$$\alpha int \leftarrow \alpha int + (\alpha - \alpha slip) \cdot \Delta t \quad (1)$$

The processing of steps S200 to S204 is repeated until the angular acceleration α decreases below the preset threshold value αslip (step S196). Namely the integration interval is between the time point when the angular acceleration α exceeds the threshold value αslip and the time point when the angular acceleration α decreases below the threshold value αslip. The torque restoration limit δ1 is set by multiplying the time integration αint by a predetermined coefficient k1 (step S208). The torque restoration limit δ1 setting routine is here terminated. This routine calculates the torque restoration limit δ1 by multiplication of the predetermined coefficient k1. One modified procedure may prepare in advance a map representing a variation in torque restoration limit δ1 against the time integration αint and read the torque restoration limit δ1 corresponding to the given time integration αint from the map. This routine calculates the torque restoration limit δ1 from the time integration of the angular acceleration α. Another modified procedure may set the torque restoration limit δ1 based on a peak value of the angular acceleration α in the skid occurring state (that is, the value of the angular acceleration α when the time integration dα/dt of the angular acceleration α is approximate to zero). Still another modified procedure may set a fixed value to the torque restoration limit δ1, irrespective of the angular acceleration α. The concrete process of setting the torque restoration limit δ1 writes the value of the torque restoration limit δ1 into a specific area of the RAM 46.

Figure 7:
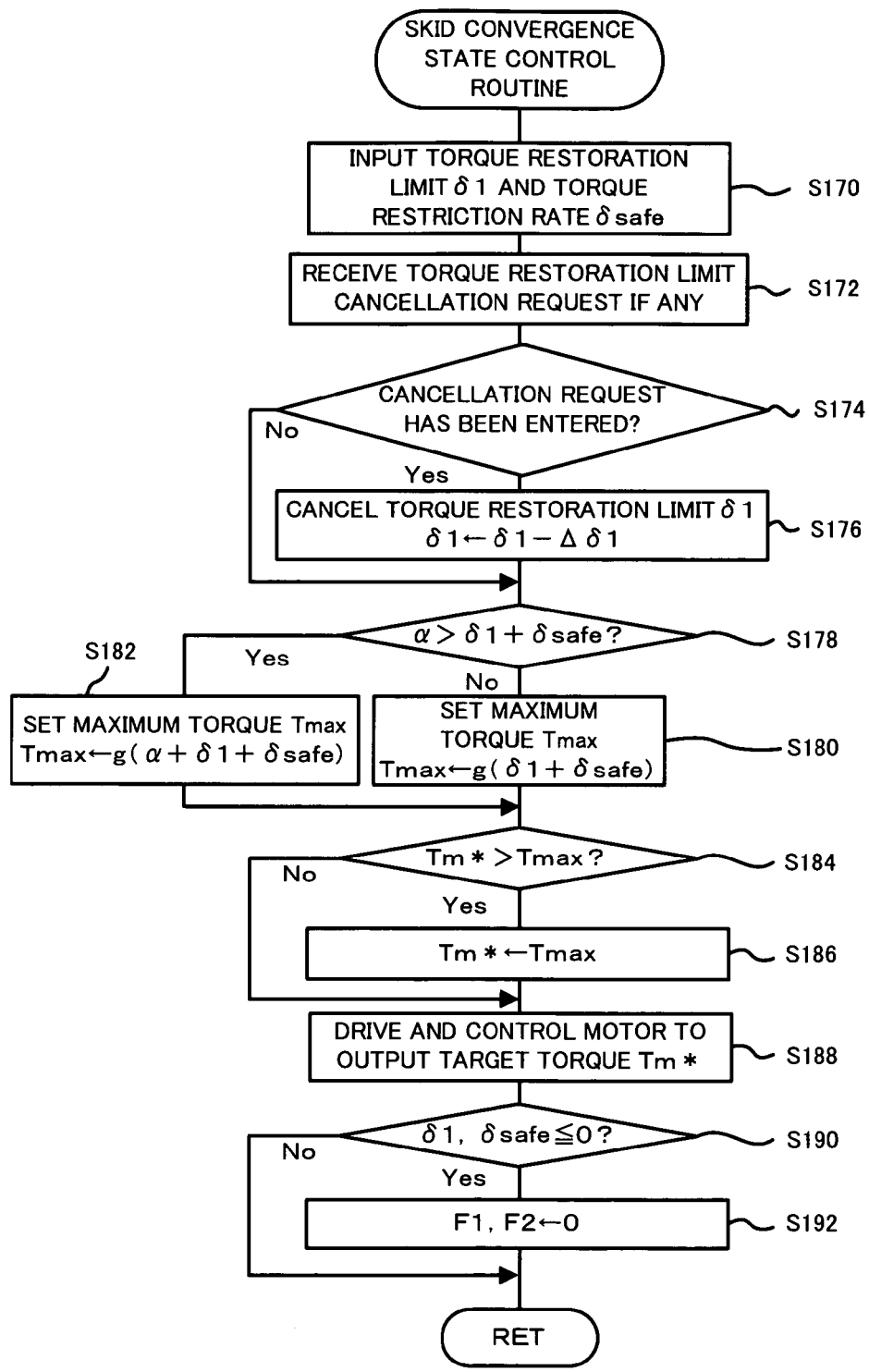
FIG. 7 is a flowchart showing a skid convergence state control routine executed by the electronic control unit 40 in the motor control apparatus 20 of the embodiment.

The torque restriction rate δsafe is a parameter set to reduce another skid, which occurs during the repeated execution of the skid convergence state control routine of FIG. 7. The initial value of the torque restriction rate δsafe is equal to 0. The torque restriction rate δsafe is described in detail later. As a matter of convenience, the following description regards the skid convergence state control routine of FIG. 7 first on the assumption that no other skid occurs (that is, when the input torque restriction rate δ2 is equal to 0) and then on the assumption that another skid occurs.

After input of the torque restoration limit δ1, the CPU 42 inputs a cancellation request of canceling the torque restoration limit δ1 if any (step S172) and determines whether the cancellation request has been entered (step S174). This process determines whether a cancellation request has been input to cancel the torque restoration limit δ1 as the parameter used to set the maximum torque Tmax. The concrete procedure of inputting a cancellation request reads out the cancellation request, which was written in a predetermined area in the RAM 46 according to a torque restoration limit δ1 cancellation routine of FIG. 9 as discussed below. This torque restoration limit δ1 cancellation routine is executed repeatedly at preset time intervals (for example, at every 8 msec) during execution of the skid convergence state control routine of FIG. 7 (while the skid convergence flag F2 is fixed to the value 1).

Figure 10:
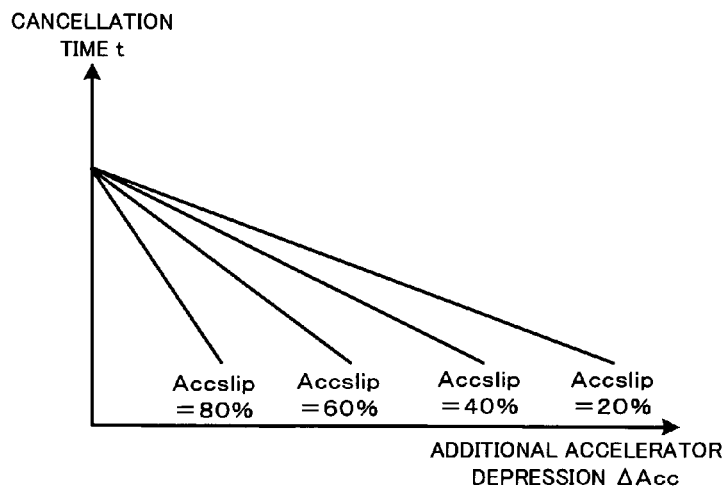
FIG. 10 is a map showing variations in cancellation time t against skid-state accelerator opening Accslip and additional accelerator depression $\Delta Acc$.
Figure 11:
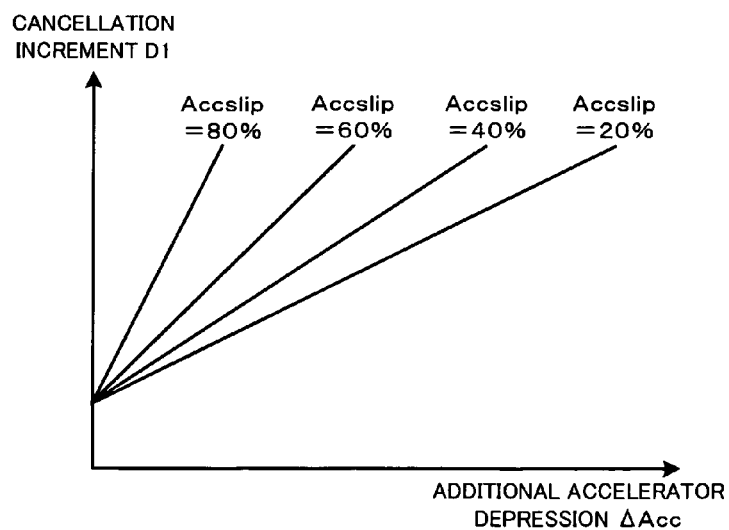
FIG. 11 is a map showing variations in cancellation increment D1 against the skid-state accelerator opening Accslip and the additional accelerator depression $\Delta Acc$.

When the torque restoration limit δ1 cancellation routine starts, the CPU 42 of the electronic control unit 40 first inputs a skid-state accelerator opening Accslip and the accelerator opening Acc (step S210). The skid-state accelerator opening Accslip represents an accelerator opening at the time of the occurrence of a skid. In a more concrete definition, the skid-state accelerator opening Accslip is an accelerator opening detected by the accelerator pedal position sensor 34 when the skid occurrence flag F1 is set from 0 to 1. In this embodiment, the concrete procedure of inputting the skid-state accelerator opening Accslip reads out the accelerator opening, which was detected by the accelerator pedal position sensor 34 at the time of the occurrence of a skid and was written into a predetermined area in the RAM 46. The CPU 42 subsequently subtracts the input skid-state accelerator opening Accslip from the input accelerator opening Acc to calculate an additional accelerator depression ΔAcc (=Acc−Accslip) since the occurrence of the skid (step S212). The CPU 42 sets a cancellation time t of the torque restoration limit δ1, based on the calculated additional accelerator depression ΔAcc and the input skid-state accelerator opening Accslip (step S214). A concrete procedure of setting the cancellation time t of the torque restoration limit δ1 in this embodiment stores in advance variations in cancellation time t against the additional accelerator depression ΔAcc and the skid-state accelerator opening Accslip as a map in the ROM 44 and reads the cancellation time t corresponding to the given additional accelerator depression ΔAcc and the given skid-state accelerator opening Accslip from the map. One example of this map is shown in FIG. 10. As shown in FIG. 10, a shorter time period is set to the cancellation time t with an increase in additional accelerator depression ΔAcc. The greater additional accelerator depression ΔAcc suggests that the driver demands a higher acceleration. Setting the shorter cancellation time t enables the torque restriction with the torque restoration limit δ1 to be cancelled in a shorter time period, in response to the driver's high acceleration demand. After setting the cancellation time t, the CPU 42 waits until elapse of the set cancellation time t (step S216). When the cancellation time t has elapsed, the CPU 42 subsequently sets a cancellation increment D1 of a cancellation rate Δδ1 for canceling the torque restoration limit δ1, based on the calculated additional accelerator depression ΔAcc and the input skid-state accelerator opening Accslip (step S218). The CPU 42 then increments the cancellation rate Δδ1 by the set cancellation increment D1 to update the cancellation rate Δδ1 (step S219) and exits from this torque restoration limit δ1 cancellation routine. A concrete procedure of setting the cancellation increment D1 in this embodiment stores in advance variations in cancellation increment D1 against the additional accelerator depression ΔAcc and the skid-state accelerator opening Accslip as a map in the ROM 44 and reads the cancellation increment D1 corresponding to the given additional accelerator depression ΔAcc and the given skid-state accelerator opening Accslip from the map. One example of this map is shown in FIG. 11. As shown in FIG. 11, a greater value is set to the cancellation increment D1 with an increase in additional accelerator depression ΔAcc. The greater additional accelerator depression ΔAcc suggests that the driver demands a higher acceleration. Setting the greater cancellation increment D1 enables the torque restriction with the torque restoration limit δ1 to be cancelled by a greater degree, in response to the driver's high acceleration demand. The concrete process of setting the cancellation rate Δδ1 writes the value of the cancellation rate Δδ1 into a specific area of the RAM 46.

Referring back to the routine of FIG. 7, in the event of detection of a cancellation request, the CPU 42 subtracts the cancellation rate Δδ1 from the torque restoration limit δ1, which is input at step S170, to cancel the torque restoration limit δ1 (step S176). In the event of no detection of a cancellation request, on the other hand, the torque restoration limit δ1 is not cancelled. The torque restoration limit δ1 is not cancelled until elapse of the cancellation time t at step S216 in the routine of FIG. 9 after the start of the skid convergence state control routine. The angular acceleration α calculated at step S104 in the routine of FIG. 2 is then compared with the sum of the torque restoration limit δ1 and the torque restriction rate δsafe (step S178). In this cycle, it is assumed that no skid reoccurs. The torque restriction rate δsafe is thus equal to 0, and the angular acceleration α is not greater than the sum of the torque restoration limit δ1 and the torque restriction rate δsafe (=0). The CPU 42 accordingly refers to the map of FIG. 6 and sets the maximum torque Tmax as an upper limit of torque output from the motor 12 corresponding to the torque restoration limit δ1 (step S180).

After setting the maximum torque Tmax, the motor torque demand Tm* is compared with the preset maximum torque Tmax (step S184). When the motor torque demand Tm* exceeds the maximum torque Tmax, the motor torque demand Tm* is limited to the maximum torque Tmax (step S186). The CPU 42 then sets the motor torque demand Tm* to a target torque and drives and controls the motor 12 to output a torque corresponding to the target torque Tm* (step S188). The torque control of the motor 12 based on the torque restoration limit δ1, which is set corresponding to the time integration of the angular acceleration α, ensures restoration of the restricted torque to an adequate level in response to convergence of a skid according to the current skid state. Under the condition of a large time integration of the angular acceleration α, which suggests a high potential for occurrence of another skid, the torque restoration level is set low in response to convergence of a skid. Under the condition of s small time integration of the angular acceleration α, which suggests a low potential for occurrence of another skid, on the contrary, the torque restoration level is set high to effectively prevent the occurrence of another skid without excessive torque restriction. After the drive control of the motor 12, the CPU 42 determines whether the torque restoration limit δ1 is not higher than 0, that is, whether the torque restoration limit δ1 is completely cancelled (step S190). In the case of complete cancellation, both the skid occurrence flag F1 and the skid convergence flag F2 are reset to zero (step S192). The program then terminates the skid convergence state control routine.

Figure 12:
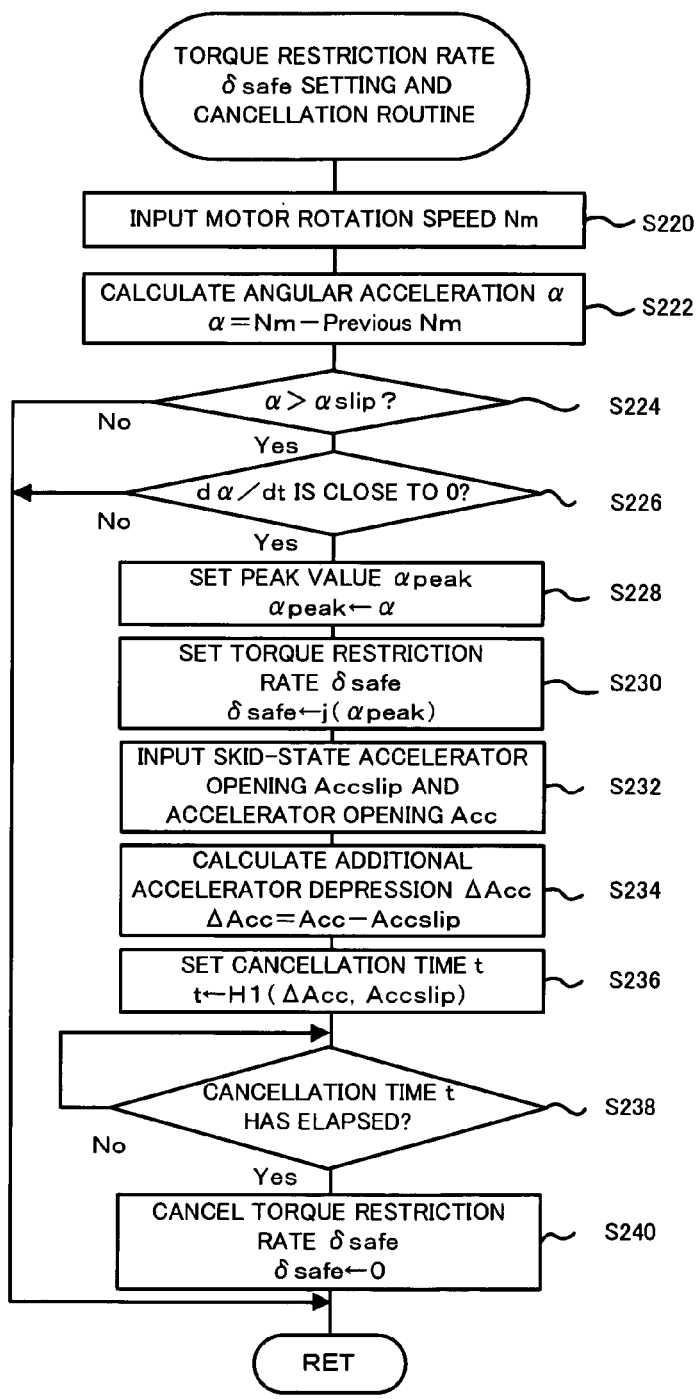
FIG. 12 is a flowchart showing a torque restriction rate $\delta safe$ setting and cancellation routine executed by the electronic control unit 40 in the motor control apparatus 20 of the embodiment.

The above description regards the skid convergence state control on the assumption of no reoccurrence of a skid. The following description is on the assumption of reoccurrence of a skid during the repeated execution of the skid convergence state control routine. In the event of reoccurrence of a skid, the torque restriction is implemented again with the setting of the torque restriction rate δsafe. The torque restriction rate δsafe is set according to a torque restriction rate δsafe setting and cancellation routine shown in FIG. 12. This routine is executed repeatedly at preset time intervals (for example, at every 8 msec) during the repeated execution of the skid convergence state control routine of FIG. 7, that is, for a time period between the time of setting the skid convergence flag F2 to 1 and the time of resetting the skid convergence flag F2 to 0.

When the torque restriction rate δsafe setting and cancellation routine starts, the CPU 42 of the electronic control unit 40 first inputs the rotation speed Nm of the motor 12 (step S220) and calculates the angular acceleration α from the input rotation speed Nm (step S222). The CPU 42 then determines whether the calculated angular acceleration α exceeds the preset threshold value αslip, that is, detects reoccurrence or non-reoccurrence of a skid (step S224). In response to detection of no reoccurrence of a skid, the CPU 42 immediately exits from this routine without any further processing. In response to detection of reoccurrence of a skid, on the other hand, the CPU 42 subsequently determines whether a differential dα/dt of the angular acceleration α is close to 0, that is, whether the angular acceleration α has reached a peak (step S226). When it is determined that the angular acceleration α has reached a peak, the current value of the angular acceleration α is set to a peak value αpeak (step S228). When it is determined that the angular acceleration α has not yet reached a peak, on the other hand, the CPU 42 immediately exits from this routine without any further processing.

Figure 13:
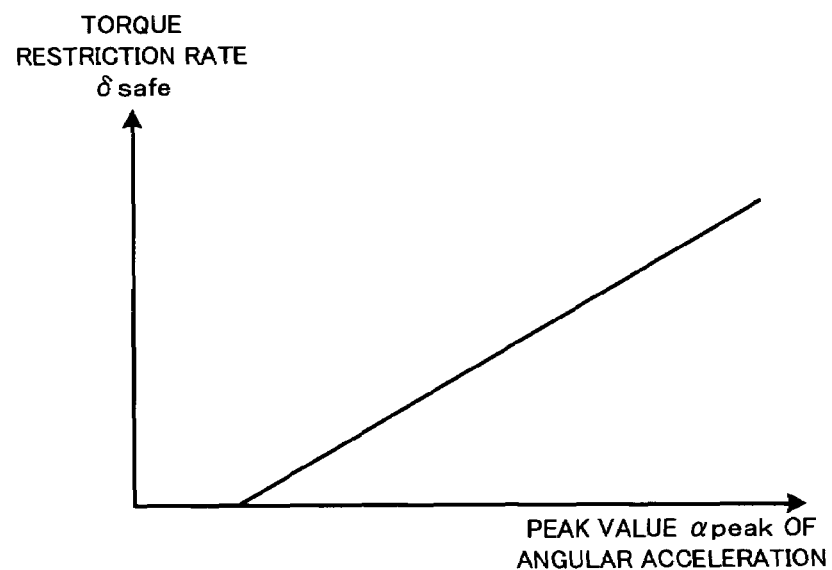
FIG. 13 is a map showing a variation in torque restriction rate $\delta safe$ against peak value $\alpha peak$ of the angular acceleration $\alpha$.

The CPU 42 then sets the torque restriction rate δsafe for reduction of the reoccurring skid, based on the peak value αpeak (step S230). A concrete procedure of setting the torque restriction rate δsafe in this embodiment stores in advance a variation in torque restriction rate δsafe against the peak value αpeak as a map in the ROM 44 and reads the torque restriction rate δsafe corresponding to the given peak value αpeak. One example of this map is shown in FIG. 13. As shown in FIG. 13, this map sets a greater value to the torque restriction rate δsafe with an increase in peak value αpeak of the angular acceleration α. The torque restriction rate δsafe is set basically to reduce another skid, which is caused by forced cancellation of the torque restoration rate δ1 in response to the driver's additional depression of the accelerator pedal 33. The procedure of this embodiment regulates the torque restriction rate δsafe to a sufficient value for effectively preventing an excess skid of the drive wheels 18a and 18b, which may lead to an unstable state of the vehicle 10.

Figure 9:
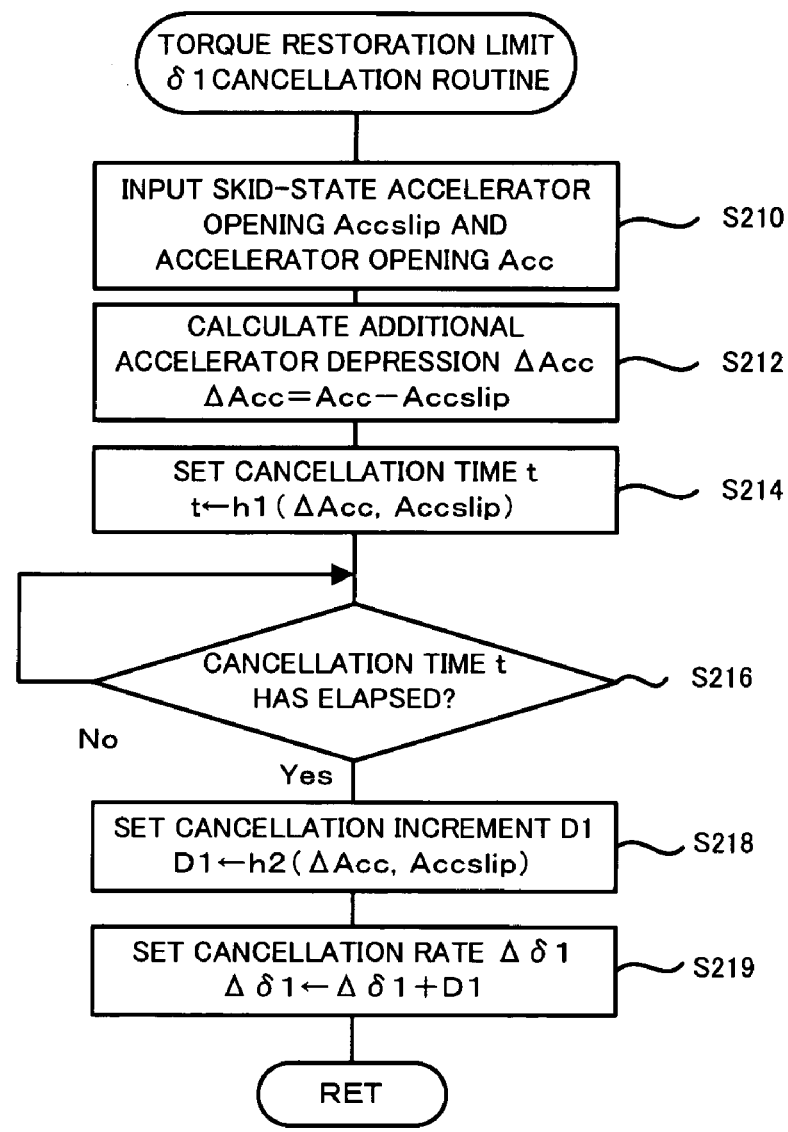
FIG. 9 is a flowchart showing a torque restoration limit $\delta 1$ cancellation routine executed by the electronic control unit 40 in the motor control apparatus 20 of the embodiment.

After setting the torque restriction rate δsafe, the CPU 42 inputs the skid-state accelerator opening Accslip and the accelerator opening Acc (step S232) and calculates the additional accelerator depression ΔAcc (=Acc−Accslip) (step S234). The CPU 42 sets a cancellation time t of the torque restriction rate δsafe, based on the calculated additional accelerator depression ΔAcc and the input skid-state accelerator opening Accslip (step S236) and waits until elapse of the set cancellation time t (step S238). A map similar to the map of FIG. 10 used for the processing of step S214 in the torque restoration limit δ1 cancellation routine of FIG. 9 is basically used to set the cancellation time t. Since the torque restriction rate δsafe is set to prevent an excess skid, it is desirable that the cancellation time t of the torque restriction rate δsafe is shorter than the cancellation time t of the torque restoration limit δ1. After elapse of the set cancellation time t, the CPU 42 fully cancels the torque restriction rate δsafe (step S240) and exits from this routine. This procedure cancels the torque restriction rate δsafe all at once. One modified procedure may gradually cancel the torque restriction rate δsafe with elapse of time. The concrete process of setting and canceling the torque restriction rate δsafe writes the value of the torque restriction rate δsafe into a specific area of the RAM 46. The value of the torque restriction rate δsafe written in the specific area of the RAM 46 is read to be processed in the skid convergence state control routine of FIG. 7. The flow of the routine of FIG. 7 in response to detection of reoccurrence of a skid is described below, while description of the overlapped portion with the flow in response to detection of no reoccurrence of a skid is omitted.

In the event of reoccurrence of a skid, the skid convergence state control routine of FIG. 7 is executed for a time period between the time of setting the torque restriction rate δsafe and the time of canceling the torque restriction rate δsafe. The CPU 42 inputs the set torque restriction rate δsafe (step S170) and sets the maximum torque Tmax, based on the sum of the torque restoration limit δ1 and the torque restriction rate δsafe (δ1+δsafe) (step S182). In this skid reoccurring state, the driver's additional depression of the accelerator pedal 33 partly cancels the torque restoration limit δ1, and the motor 12 is controlled with the maximum torque Tmax, which has been set only based on the torque restoration limit δ1. The control procedure accordingly refers to the map of FIG. 6 and sets the maximum torque Tmax corresponding to the sum of the torque restoration limit δ1 and the torque restriction rate δsafe and restricts the torque output from the motor 12. This effectively prevents reoccurrence of an excess skid. The maximum torque Tmax is set in this manner (step S180) in the case of reoccurrence of a relatively light skid when the angular acceleration α is not greater than the sum of the torque restoration limit δ1 and the torque restriction rate δsafe at step S178 in FIG. 7. In the case of reoccurrence of a relatively heavy skid when the angular acceleration α is greater than the sum of the torque restoration limit δ1 and the torque restriction rate δsafe, the control procedure sets the maximum torque Tmax based on the sum of the torque restoration limit δ1, the torque restriction rate δsafe, and the angular acceleration α (δ1+δsafe+α) (step S182) and controls the operation of the motor 12 with the more restricted maximum torque Tmax. One modified procedure may set the maximum torque Tmax based on the sum of the torque restoration limit δ1 and the torque restriction rate δsafe, regardless of the magnitude of a reoccurring skid.

Figure 14:
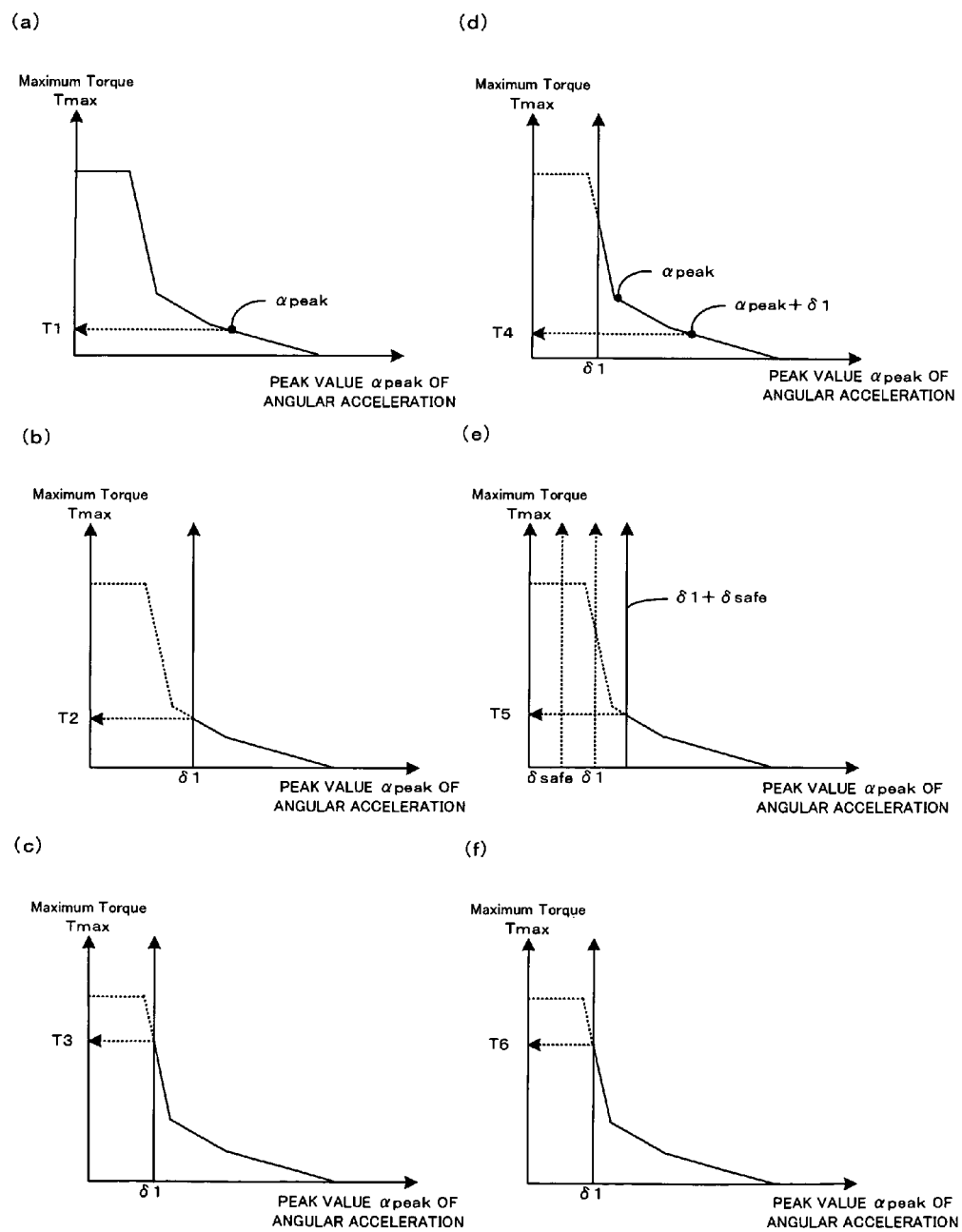
FIG. 14 shows a process of setting the maximum torque Tmax.

FIG. 14 shows a process of setting the maximum torque Tm*. In response to detection of a skid when the angular acceleration α of the rotating shaft of the motor 12 exceeds the preset threshold value αslip, the control procedure gradually decreases the maximum torque Tmax with a variation in angular acceleration α according to the map of FIG. 6. When the angular acceleration α reaches a peak, the torque level is restricted to the maximum torque Tmax (=value T1) corresponding to the peak value αpeak (see FIG. 14(a)). The maximum torque Tmax is kept to the value T1 until determination of convergence of the skid based on a negative level of the angular acceleration α. In response to determination of convergence of the skid, the torque level is restored to the maximum torque Tmax (=value T2) corresponding to the torque restoration limit δ1, which is set according to the time integration of the angular acceleration α (that is, the skid state), irrespective of the current value of the angular acceleration α (see FIG. 14(b)). The limitation of torque restoration with the torque restoration limit δ1 effectively prevents reoccurrence of a skid. After elapse of the preset cancellation time according to the driver's additional depression ΔAcc of the accelerator pedal 33, the torque restoration limit δ1 is cancelled by the cancellation rate corresponding to the additional accelerator depression ΔAcc. The torque level is then restored to the maximum torque Tmax (=value T3) corresponding to the updated torque restoration limit δ1 (see FIG. 14(c)). In the event of reoccurrence of a skid due to the torque restoration, the torque level is restricted again to the maximum torque Tmax (=value T4) corresponding to the sum of the updated torque restoration limit δ1 and the peak value αpeak of the angular acceleration α increasing in the skid reoccurring state (see FIG. 14(d)). In this state, the torque restriction rate δsafe is set corresponding to the peak value αpeak of the angular acceleration α. Even in the event of a decrease in angular acceleration α due to another torque restriction, the torque restoration level is limited again to the maximum torque Tmax (=value T5) corresponding to the sum of the torque restoration limit δ1 and the torque restriction rate δsafe (see FIG. 14(e)). The torque restriction rate δsafe is cancelled according to the additional accelerator depression ΔAcc after elapse of the preset cancellation time. The torque level is accordingly restored to the maximum torque Tmax (=value T6) corresponding to only the torque restoration limit δ1 (see FIG. 14(f)).

As described above, the motor control apparatus 20 of the embodiment restricts the torque output from the motor 12 in response to the occurrence of a skid due to wheelspin of the drive wheels 18a and 18b. In the event of reduction of the skid, the motor control apparatus 20 varies the degree of cancellation of the torque restriction (the cancellation rate and the cancellation time) according to the driver's additional depression ΔAcc of the accelerator pedal 33. The control procedure of this embodiment sets a greater value to the cancellation rate of the torque restriction and a smaller value to the cancellation time with an increase in additional depression ΔAcc of the accelerator pedal 33. Such setting ensures a certain level of response to the driver's acceleration demand, while effectively reducing the skid of the drive wheels 18a and 18b. This arrangement enhances the drivability in the skid control. In the event of reoccurrence of a skid by cancellation of the torque restriction in response to the driver's additional depression of the accelerator pedal 33, the control procedure controls the motor 12 to prevent an excess level of the reoccurring skid. This arrangement thus makes the driver feel the reoccurrence of a skid and release the accelerator pedal 33, while preventing the excess level of the reoccurring skid, which may lead to the unstable state of the vehicle 10.

In the event of reoccurrence of a skid, that is, when the angular acceleration α exceeds the preset threshold value αslip again during repeated execution of the skid convergence state control routine of FIG. 7, the motor control apparatus 20 of the embodiment sets the torque restriction rate δsafe according to the peak value αpeak of the angular acceleration α and restricts the torque level again with the set torque restriction rate δsafe to prevent an excess level of the reoccurring skid. One modified procedure may alternatively execute the skid occurring state control routine of FIG. 5 in response to reoccurrence of a skid. This modified procedure resets the skid convergence flag F2 from 1 to 0 when it is determined at step S130 that the angular acceleration α exceeds the preset threshold value αslip in the skid state determination routine of FIG. 4. This triggers the skid occurring state control routine, instead of the skid convergence state control routine, since the skid occurrence flag F1 is equal to 1 and the skid convergence flag F2 is equal to 0. This modified procedure naturally does not require the series of processing with respect to the torque restriction rate δsafe.

A motor control apparatus of a second embodiment is discussed below. The motor control apparatus of the second embodiment has the same hardware configuration as that of the motor control apparatus 20 of the first embodiment. The only difference is series of processing executed by the electronic control unit. The hardware configuration of the motor control apparatus of the second embodiment is thus not specifically described here. The motor control apparatus 20 of the first embodiment detects a skid based on a variation in angular acceleration α and controls the operation of the motor 12 in response to detection of the skid. The motor control apparatus of the second embodiment, on the other hand, detects a skid based on a variation in difference between the wheel speed Vf of the drive wheels and the wheel speed Vr of the driven wheels (that is, wheel speed difference ΔV) and controls the operation of the motor in response to detection of the skid. Determination of the skid state based on the wheel speed difference ΔV follows a skid state determination routine shown in FIG. 15.

Figure 15:
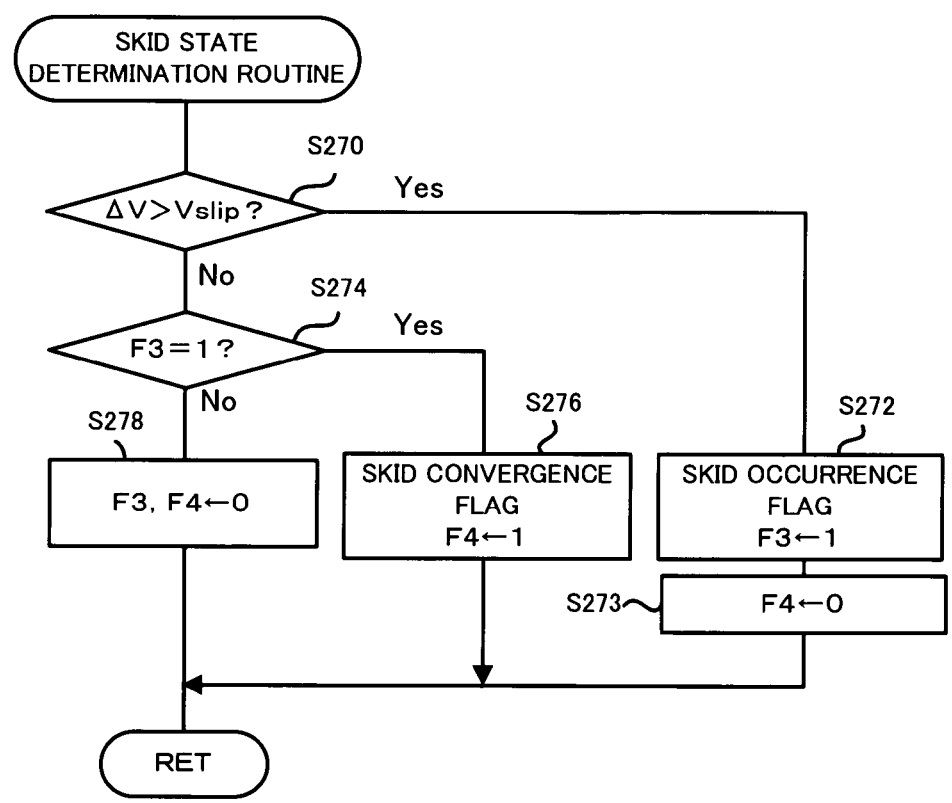
FIG. 15 is a flowchart showing a skid state determination routine executed by an electronic control unit in a motor control apparatus of a second embodiment.

When the skid state determination routine of FIG. 15 starts, the CPU of the electronic control unit first determines whether the wheel speed difference ΔV exceeds a preset threshold value Vslip (step S270). When the wheel speed difference ΔV exceeds the preset threshold value Vslip, the CPU detects the occurrence of a skid and sets a skid occurrence flag F3 to 1 (step S272) and resets a skid convergence flag F4 to 0 (step S273), before exiting from this routine. When the wheel speed difference ΔV does not exceed the preset threshold value Vslip, on the other hand, the CPU subsequently determines whether the skid occurrence flag F3 is equal to 1 (step S274). When the skid occurrence flag F3 is equal to 1, the CPU determines convergence of the skid and sets the skid convergence flag F4 to 1 (step S276), before exiting from this routine. When the skid occurrence flag F3 is not equal to 1, on the contrary, the CPU resets both the flags F3 and F4 to 0 (step S278) and terminates this routine.

The motor control procedure based on the determined skid state executes grip state control when both the flags F3 and F4 are equal to 0, skid occurring state control when the flag F3 is equal to 1 and the flag F4 is equal to 0, and skid convergence state control when both the flags F3 and F4 are equal to 1. These controls are described in detail. The grip state control is identical with the grip state control executed by the motor control apparatus 20 of the first embodiment and is thus not specifically described here.

Figure 16:
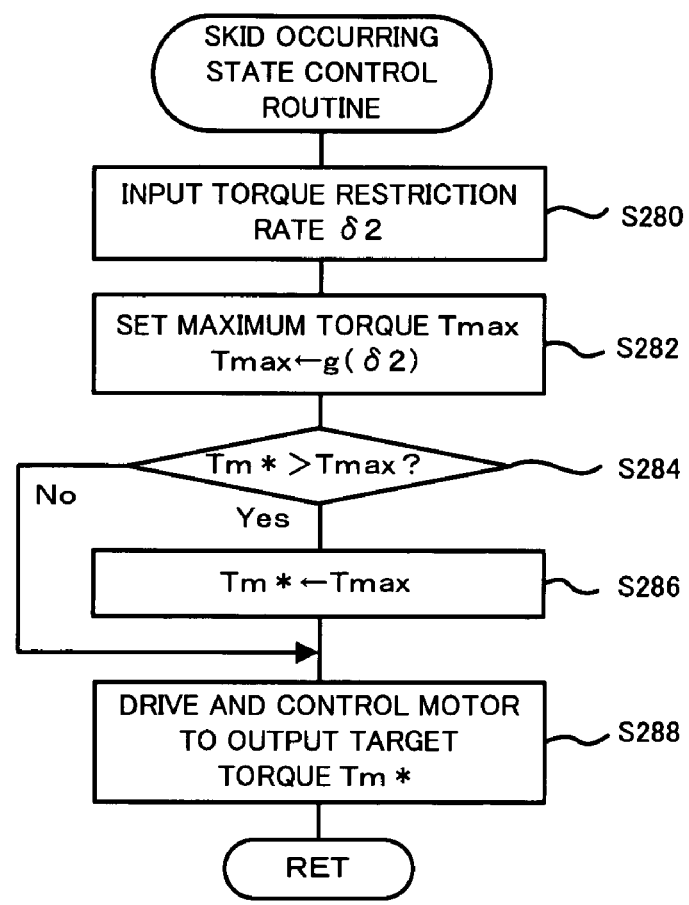
FIG. 16 is a flowchart showing a skid occurring state control routine executed by an electronic control unit in a motor control apparatus of a second embodiment.
Figure 17:
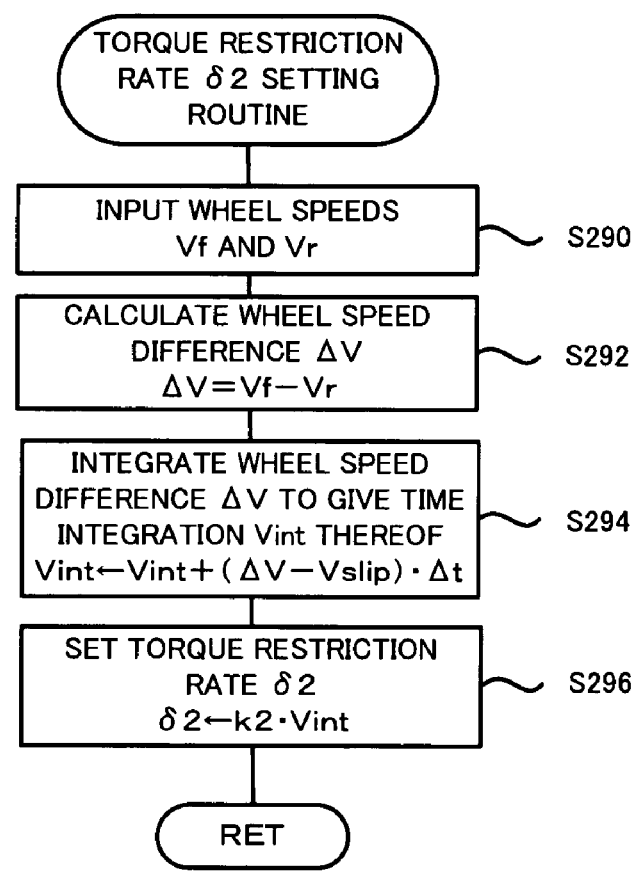
FIG. 17 is a flowchart showing a torque restriction rate δ2 setting routine executed by an electronic control unit in a motor control apparatus of a second embodiment.

The skid occurring state control drives and controls the motor to lower the wheel speed difference $\Delta V$, which was increased by the occurrence of a skid, and follows a skid occurring state control routine of FIG. 16. When the skid occurring state control routine starts, the CPU of the electronic control unit first inputs a torque restriction rate $\delta 2$ (step S260). The torque restriction rate $\delta 2$ is a parameter used to set the maximum torque Tmax of the motor for elimination of a skid. The torque restriction rate $\delta 2$ is set according to a torque restriction rate $\delta 2$ setting routine shown in FIG. 17 as discussed below. The torque restriction rate $\delta 2$ setting routine of FIG. 17 is executed repeatedly at preset time intervals (for example, at every 8 msec) for a time period between the time of setting the skid occurrence flag F3 from 0 to 1 at step S272 in the skid state determination routine of FIG. 15 and the time of setting the skid convergence flag F4 from 0 to 1. The torque restriction rate $\delta 2$ setting routine first inputs the wheel speeds Vf and Vr (step S290), calculates the wheel speed difference $\Delta V$ as a difference between the input wheel speeds Vf and Vr (step S292), and integrates the calculated wheel speed difference $\Delta V$ to give a time integration Vint thereof over an integration interval since the wheel speed difference $\Delta V$ exceeded the preset threshold value Vslip (step S294). In this embodiment, the time integration Vint of the wheel speed difference $\Delta V$ is given by Equation (2) below, where $\Delta t$ denotes the execution time interval of this routine:

$$\text{Vint} \leftarrow \text{Vint} + (\Delta V - \text{Vslip}) \cdot \Delta t \quad (2)$$

The torque restriction rate $\delta 2$ is set by multiplying the time integration Vint of the wheel speed difference $\Delta V$ by a predetermined coefficient k2 (step S296). The torque restriction rate $\delta 2$ setting routine is here terminated. This routine calculates the torque restriction rate $\delta 2$ by multiplication of the predetermined coefficient k2. One modified procedure may prepare in advance a map representing a variation in torque restriction rate $\delta 2$ against the time integration Vint and read the torque restriction rate $\delta 2$ corresponding to the given time integration Vint from the map. The set torque restriction rate $\delta 2$ is successively written into a specific area of the RAM 46 to be updated and is input in the routine of FIG. 16. The procedure of this embodiment sets the torque restriction rate $\delta 2$ corresponding to the time integration of the wheel speed difference $\Delta V$. The torque restriction rate $\delta 2$ may otherwise be set corresponding to the value of the wheel speed difference $\Delta V$ or may be fixed to a preset value regardless of the value of the wheel speed difference $\Delta V$.

Referring back to the routine of FIG. 16, after input of the torque restriction rate $\delta 2$, the maximum torque Tmax as the upper limit of torque output from the motor 12 is set corresponding to the input torque restriction rate $\delta 2$ by referring to the map of FIG. 6 (step S282). After setting the maximum torque Tmax, a motor torque demand Tm* is compared with the maximum torque Tmax (step S284). When the motor torque demand Tm* exceeds the maximum torque Tmax, the motor torque demand Tm* is limited to the maximum torque Tmax (step S286). The CPU then sets the motor torque demand Tm* to a target torque and drives and controls the motor 12 to output a torque corresponding to the target torque Tm* (step S288), before exiting from this skid occurring state control routine. The torque output from the motor 12 in the occurrence of a skid is limited to a lower level (that is, the maximum torque Tmax corresponding to the torque restriction rate $\delta 2$ [rpm/8 msec] in the map of FIG. 6) for immediate reduction of the skid. This limitation effectively reduces the skid.

Figure 18:
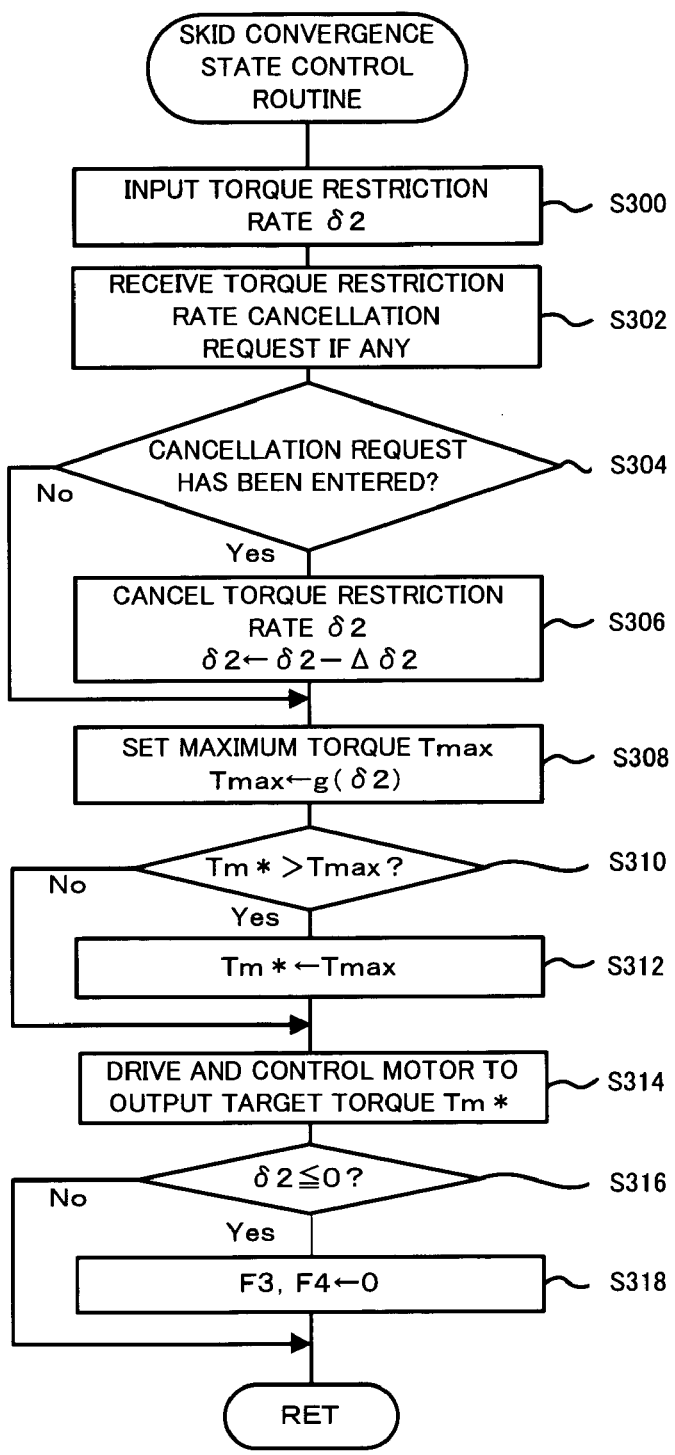
FIG. 18 is a flowchart showing a skid convergence state control routine executed by an electronic control unit in a motor control apparatus of a second embodiment.
Figure 19:
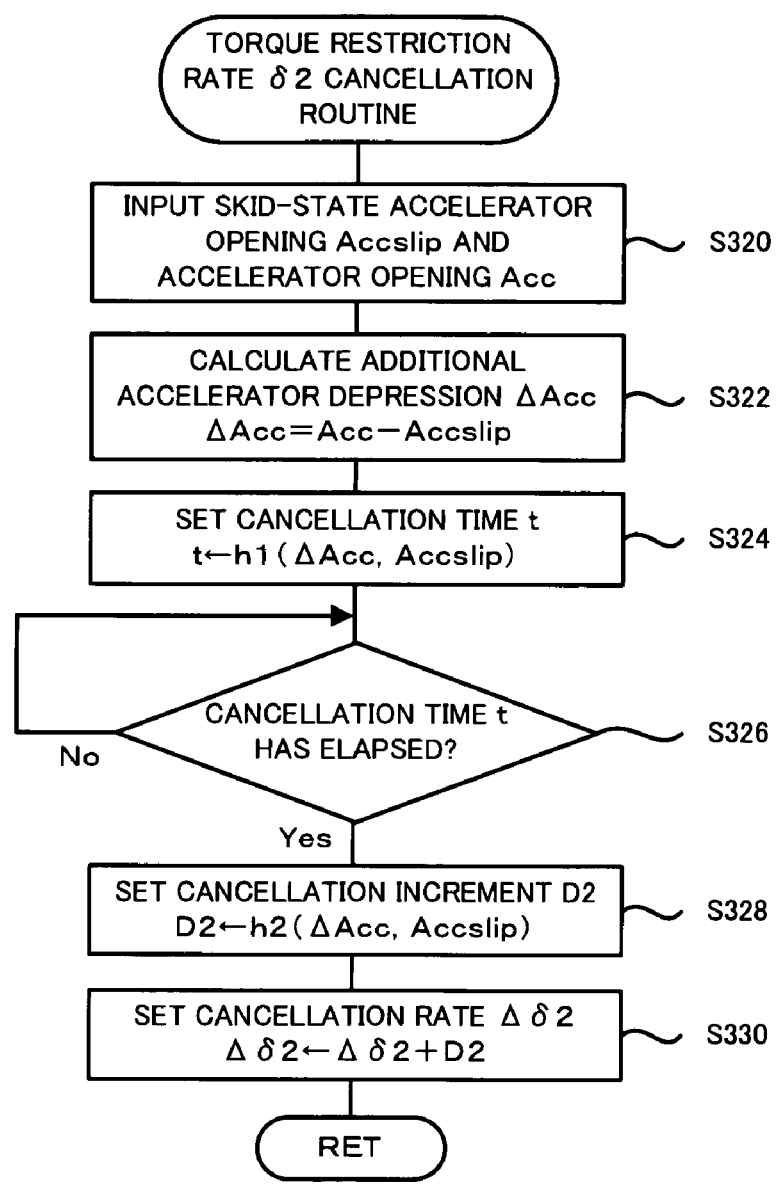
FIG. 19 is a flowchart showing a torque restriction rate δ2 cancellation routine executed by an electronic control unit in a motor control apparatus of a second embodiment.

The skid convergence state control drives and controls the motor to restore the torque level limited in response to the decreasing wheel speed difference $\Delta V$ by the skid occurring state control, and follows a skid convergence state control routine of FIG. 18. When the skid convergence state control routine starts, the CPU of the electronic control unit first inputs the last setting of the torque restriction rate $\delta 2$, which has been set in the last cycle of the repeatedly executed torque restriction rate $\delta 2$ setting routine of FIG. 17 (that is, immediately before the skid convergence flag F4 is set from 0 to 1) (step S300). The CPU 42 receives a cancellation request of the input torque restriction rate $\delta 2$ if any (step S302) and determines whether the cancellation request has been entered (step S304). The cancellation request of the torque restriction rate $\delta 2$ is entered according to a torque restriction rate $\delta 2$ cancellation routine of FIG. 19. This torque restriction rate $\delta 2$ cancellation routine is basically similar to the torque restoration limit $\delta 1$ cancellation routine of FIG. 9 and is executed repeatedly at preset time intervals (for example, at every 8 msec) during execution of the skid convergence state control routine of FIG. 18. The torque restriction rate $\delta 2$ cancellation routine first inputs the skid-state accelerator opening Accslip and the accelerator opening Acc (step S320), calculates their difference as the additional accelerator depression $\Delta$Acc (step S322), and sets a cancellation time t of the torque restriction rate $\delta 2$, based on the calculated additional accelerator depression $\Delta$Acc and the input skid-state accelerator opening Accslip (step S324). The cancellation time t is set according to a map having the similar characteristics to those of the map of FIG. 10. After setting the cancellation time t, the routine waits until elapse of the set cancellation time t (step S2326). When the cancellation time t has elapsed, the routine subsequently sets a cancellation increment D2 of a cancellation rate $\Delta\delta 2$ for canceling the torque restriction rate $\delta 2$, based on the calculated additional accelerator depression $\Delta$Acc and the input skid-state accelerator opening Accslip (step S328). The routine then increments the cancellation rate $\Delta\delta 2$ by the set cancellation increment D2 to update the cancellation rate $\Delta\delta 2$ (step S330) and is terminated. The cancellation increment D2 is set according to a map having the similar characteristics to those of the map of FIG. 11. The cancellation rate $\Delta\delta 2$ is successively written into a specific area of the RAM 46 to bed updated and is subjected to the processing routine of FIG. 18.

Referring back to the skid convergence state control routine of FIG. 18, in the event of detection of a cancellation request (that is, when the cancellation rate $\Delta\delta 2$ is not equal to 0), the CPU subtracts the cancellation rate $\Delta\delta 2$ from the torque restriction rate $\delta 2$, which is input at step S230, to cancel the torque restriction rate $\delta 2$ (step S306). In the event of no detection of a cancellation request, on the other hand, the torque restriction rate δ2 is not cancelled. The torque restriction rate δ2 is not cancelled until elapse of the cancellation time t at step S326 in the routine of FIG. 19 after the start of the skid convergence state control routine. The CPU then refers to the map of FIG. 6 and sets the maximum torque Tmax as an upper limit of torque output from the motor 12 corresponding to the torque restriction rate δ2 (step S308). After setting the maximum torque Tmax, the motor torque demand Tm* is compared with the preset maximum torque Tmax (step S310). When the motor torque demand Tm* exceeds the maximum torque Tmax, the motor torque demand Tm* is limited to the maximum torque Tmax (step S312). The CPU then sets the motor torque demand Tm* to a target torque and drives and controls the motor 12 to output a torque corresponding to the target torque Tm* (step S314). The CPU subsequently determines whether the torque restriction rate δ2 is not higher than 0, that is, whether the torque restriction rate δ2 is completely cancelled (step S316). In the case of complete cancellation, both the skid occurrence flag F3 and the skid convergence flag F4 are reset to zero (step S318). The skid convergence state control routine is here terminated. In the event of reoccurrence of a skid (when the wheel speed difference ΔV exceeds again the preset threshold value Vslip) during execution of the skid convergence state control routine of FIG. 18 after convergence of a skid (after the wheel speed difference ΔV becomes lower than the preset threshold value Vslip), the skid convergence flag F4 is reset from 1 to 0 at step S273 in the skid state determination routine of FIG. 15. This triggers the skid occurring state control routine of FIG. 18 to reduce the reoccurring skid.

Figure 20:
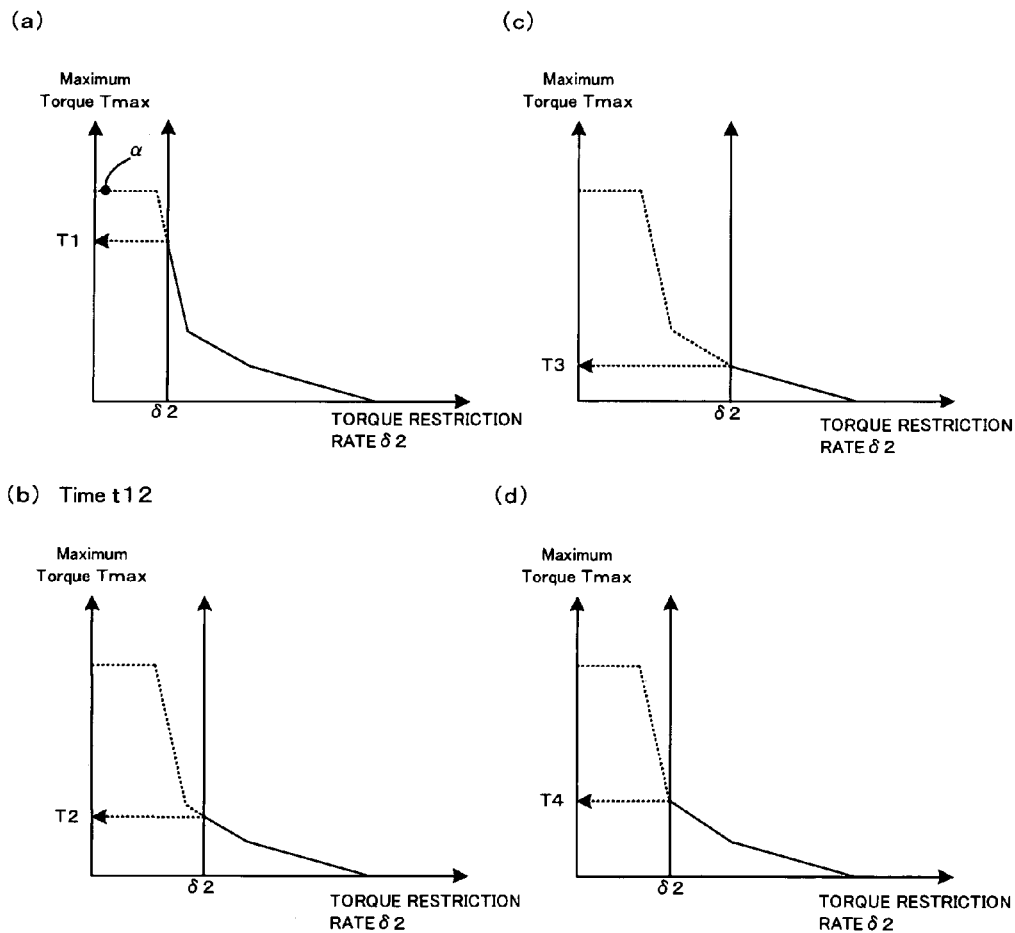
FIG. 20 shows a process of setting the maximum torque Tmax.

FIG. 20 shows a process of setting the maximum torque Tmax. As shown in FIG. 20, in response to detection of a skid when the wheel speed difference ΔV exceeds the preset threshold value Vslip, the control procedure gradually increases the torque restriction rate δ2 regardless of the angular acceleration α until the wheel speed difference ΔV becomes lower than the preset threshold value Vslip. With the increase in torque restriction rate δ2, the maximum torque Tmax gradually decreases to restrict the torque level (see FIGS. 20(a) through 20(c)). The increase of the torque restriction rate δ2 is set according to the time integration of the wheel speed difference ΔV since the time when the wheel speed difference ΔV exceeded the preset threshold value Vlip. Under the condition that the wheel speed difference ΔV becomes lower than the preset threshold value Vlip, after elapse of the preset cancellation time according to the driver's additional depression ΔAcc of the accelerator pedal 33, the torque restriction rate δ2 is cancelled by the cancellation rate Δδ2 set corresponding to the additional depression ΔAcc of the accelerator pedal 33. The torque level is then restored to the maximum torque Tmax (=value T4) corresponding to the updated torque restriction rate δ2 (see FIG. 20(d)). The control procedure then cancels the torque restriction rate δ2 in a stepwise manner to gradually restore the torque level.

As described above, like the motor control apparatus 20 of the first embodiment, the motor control apparatus of the second embodiment ensures a certain level of response to the driver's acceleration demand, while effectively reducing the skid of the drive wheels 18a and 18b. This arrangement enhances the drivability in the skid control.

The motor control apparatus of the second embodiment detects a skid based on the variation in wheel speed difference ΔV, independently of detection of a skid based on the variation in angular acceleration α by the motor control apparatus 20 of the first embodiment. The detection of a skid based on the variation in wheel speed difference ΔV may be executed only in the case of no detection of a skid based on the variation in angular acceleration α or may be executed in parallel with detection of a skid based on the variation in angular acceleration α. Such modifications advantageously succeed in detecting a minor skid, which is undetectable based on the variation in angular acceleration α, based on the variation in wheel speed difference ΔV. In the latter modification, in the event of detection of a skid by both the skid detection based on the angular acceleration α and the skid detection based on the wheel speed difference ΔV, the skid occurring state control may refer to the map of FIG. 6, set the maximum torque Tmax corresponding to the sum of the peak value αpeak [rpm/8 msec] of the angular acceleration α set at step S152 in the skid occurring state control routine of FIG. 5 and the torque restriction rate δ2 [rpm/8 msec] input at step S280 in the skid occurring state control routine of FIG. 16 (Tmax←g(αpeak+δ2)), and control the motor 12 with the setting of the maximum torque Tmax. The skid occurring state control may alternatively set the maximum torque Tmax corresponding to the greater between the peak value αpeak of the angular acceleration α and the torque restriction rate δ2 and control the motor 12 with the setting of the maximum torque Tmax. Similarly the skid convergence state control may refer to the map of FIG. 6, set the maximum torque Tmax corresponding to the grand total of the sum (δ1+δsafe) of the torque restoration limit δ1 set at step S176 (or input at step S170) and the torque restriction rate δsafe input at step S170 in the skid convergence state control routine of FIG. 7, or the sum (δ1+δsafe+α) of (δ1+δsafe) and the angular acceleration α when the angular acceleration α exceeds (δ1+δsafe), and the torque restriction rate δ2 set at step S306 (or input at step S300) in the skid convergence state control routine of FIG. 18 (Tmax←g(δ1+δsafe+δ2) or g(δ1+δsafe+δ2+α)), and control the motor 12 with the setting of the maximum torque Tmax. The skid convergence state control may alternatively set the maximum torque Tmax corresponding to the greater between (δ1+δsafe) and δ2 or between (δ1+δsafe+α) and δ2 and control the motor 12 with the setting of the maximum torque Tmax.

Figure 21:
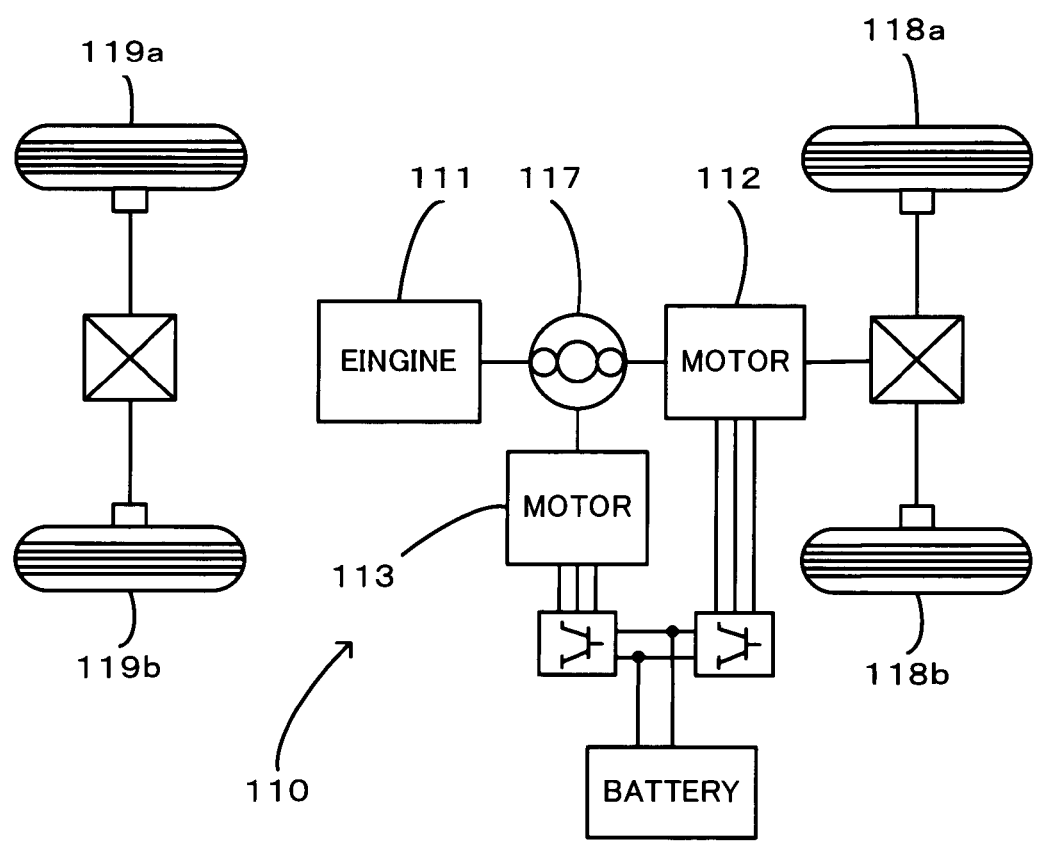
FIG. 21 schematically illustrates the configuration of a hybrid vehicle 110.
Figure 22:
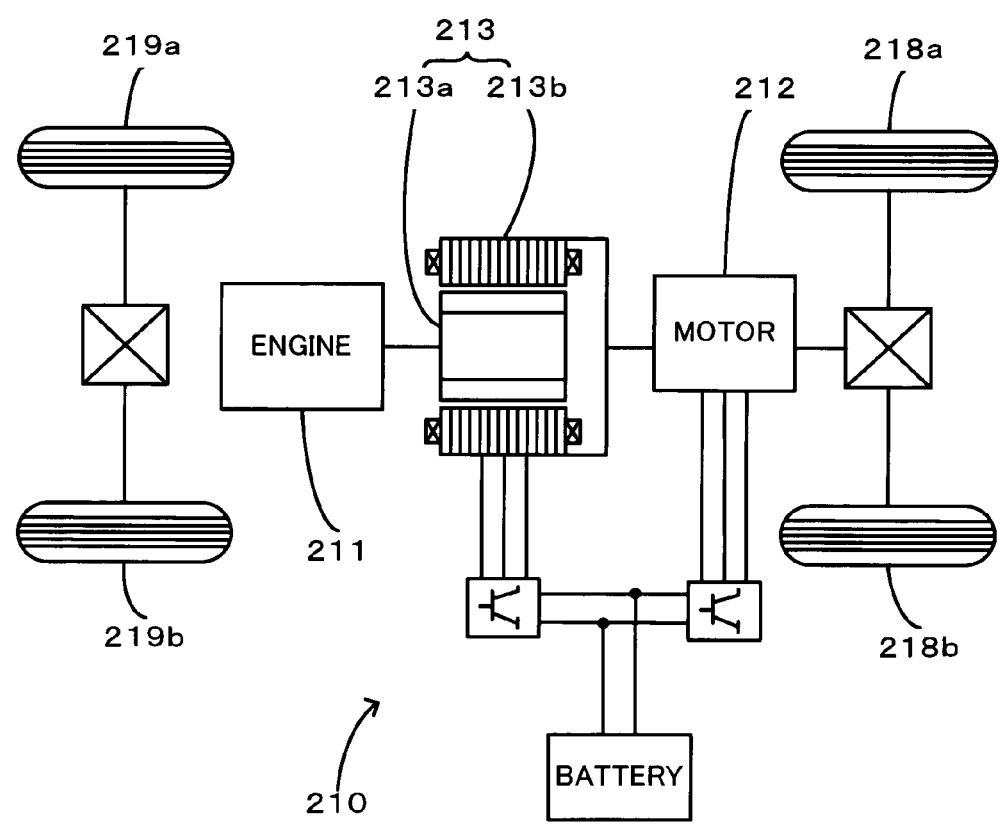
FIG. 22 schematically illustrates the configuration of a hybrid vehicle 210; and, FIG. 23 schematically illustrates the configuration of a hybrid vehicle 310.
Figure 23:
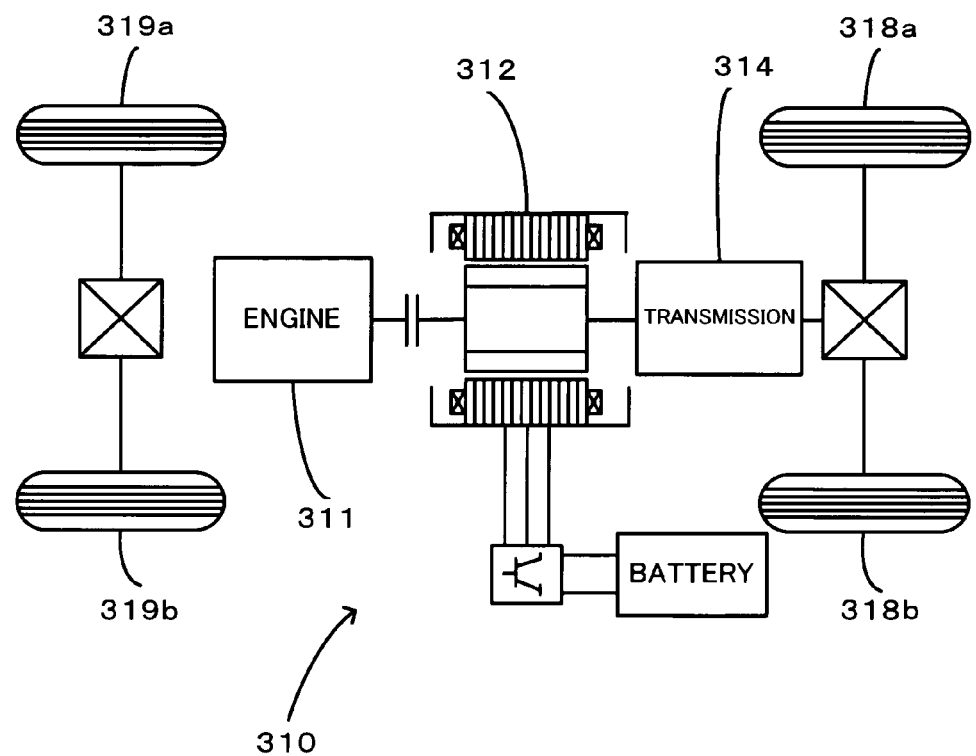

The embodiments described above regard control of the motor 12, which is mounted on the vehicle 10 and is mechanically connected with the drive shaft linked to the drive wheels 18a and 18b to directly output power to the drive shaft. The technique of the invention is applicable to a vehicle of any other structure with a motor that is capable of directly outputting power to a drive shaft. For example, one possible application of the invention is a series hybrid vehicle including an engine, a generator that is linked to an output shaft of the engine, a battery that is charged with electric power generated by the generator, and a motor that is mechanically connected with a drive shaft linked to drive wheels and is driven with a supply of electric power from the battery. Another possible application of the invention is a mechanical distribution-type hybrid vehicle 110 including an engine 111, a planetary gear 117 that is connected with the engine 111, a motor 113 that is connected with the planetary gear 117 and is capable of generating electric power, and a motor 112 that is also connected with the planetary gear 117 and is mechanically connected with a drive shaft linked to drive wheels to directly output power to the drive shaft, as shown in FIG. 21. Still another possible application of the invention is an electrical distribution-type hybrid vehicle 210 including a motor 212 that has an inner rotor 213a connected with an output shaft of an engine 211 and an outer rotor 213b connected with a drive shaft linked to drive wheels 218a and 218b and relatively rotates through electromagnetic interactions between the inner rotor 213a and the outer rotor 213b and a motor 212 that is mechanically connected with the drive shaft to directly output power to the drive shaft, as shown in FIG. 22. Another possible application of the invention is a hybrid vehicle 310 including an engine 311 that is connected with a drive shaft linked to drive wheels 318a and 318b via a transmission 314 (for example, a continuous variable transmission or an automatic transmission) and a motor 312 that is placed after the engine 311 and is connected with the drive shaft via the transmission 314 (or a motor that is directly connected with the drive shaft), as shown in FIG. 23. In the event of the occurrence of a skid on drive wheels, the torque control mainly controls the motor mechanically connected with the drive shaft, because of its high torque output response. The control of this motor may be combined with control of the other motor or with control of the engine.

The embodiments and their modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is effectively applied to automobile and train-related industries.

The invention claimed is:

1. A motor control apparatus that controls a motor, which is mounted on a vehicle and outputs power to a drive shaft linked to drive wheels, said motor control apparatus comprising:
   a skid detection module that detects a skid due to wheel spin of the drive wheels;
   a torque restriction control module that, in response to detection of a skid by said skid detection module, sets torque restriction for reduction of the skid and controls said motor under the torque restriction; and
   a torque restriction cancellation control module that, in response to at least a reducing tendency of the skid, cancels the torque restriction, which is set by said torque restriction control module, to a specific degree corresponding to a variation in a driver's accelerator operation, and controls said motor under at least partly cancelled torque restrictions,
   wherein the variation in driver's accelerator operation represents a rate of change relative to a reference accelerator operation at a time of detection of a skid by said skid detection module.

2. A motor control apparatus in accordance with claim 1, wherein said torque restriction cancellation control module cancels the torque restriction in a stepwise manner with elapse of time.

3. A motor control apparatus in accordance with claim 2, wherein said torque restriction cancellation control module controls the motor with a tendency of increasing a cancellation rate of the torque restriction with an increase in driver's additional depression of an accelerator pedal as the variation in driver's accelerator operation.

4. A motor control apparatus in accordance with claim 2, wherein said torque restriction cancellation control module controls the motor with a tendency of shortening a cancellation time of the torque restriction with an increase in driver's additional depression of an accelerator pedal as the variation in driver's accelerator operation.

5. A motor control apparatus in accordance with claim 1, said motor control apparatus further comprising:
   an angular acceleration measurement module that measures an angular acceleration of either of the drive shaft and a rotating shaft of the motor,
   wherein said skid detection module detects a skid, based on a variation in measured angular acceleration, and
   said torque restriction control module, in response to detection of a skid, changes a degree of the torque restriction corresponding to the angular acceleration measured by said angular acceleration measurement module and controls the motor under the changed degree of the torque restriction.

6. A motor control apparatus in accordance with claim 1, wherein said vehicle has driven wheels that are driven by the drive wheels,
   said motor control apparatus further comprising:
   a drive wheel rotation speed measurement module that measures a rotation speed of the drive wheels; and
   a driven wheel rotation speed measurement module that measures a rotation speed of the driven wheels;
   wherein said skid detection module detects a skid, based on a rotation speed difference between the rotation speed of the drive wheels measured by said drive wheel rotation speed measurement module and the rotation speed of the driven wheels measured by said driven wheel rotation speed measurement module, and
   said torque restriction control module, in response to detection of a skid, changes a degree of the torque restriction corresponding to the rotation speed difference and controls the motor under the changed degree of the torque restriction.

7. A motor control apparatus in accordance with claim 1, said motor control apparatus further comprising:
   a torque re-restriction control module that, in response to detection of another skid by said skid detection module under control of the motor by said torque restriction cancellation control module, sets torque re-restriction for reduction of the another skid and controls the motor under the torque re-restriction.

8. A motor control apparatus in accordance with claim 7, said motor control apparatus further comprising:
   an angular acceleration measurement module that measures an angular acceleration of either of the drive shaft and a rotating shaft of the motor,
   wherein said skid detection module detects a skid, based on a variation in measured angular acceleration, and
   said torque re-restriction control module, in response to detection of another skid by said skid detection module, changes a degree of the torque re-restriction corresponding to a peak value of the angular acceleration measured by said angular acceleration measurement module and controls the motor under the changed degree of the torque re-restriction.

9. A motor control apparatus in accordance with claim 7, said motor control apparatus further comprising:
   a torque restriction re-cancellation control module that cancels the torque re-restriction set by said torque re-restriction control module after elapse of a preset time period corresponding to a variation in driver's accelerator opening, regardless of state of the another skid, and controls the motor under the cancelled torque re-restriction.

10. A vehicle equipped with a motor and a motor control apparatus, wherein the motor control apparatus controls the motor, which is mounted on the vehicle and outputs power to a drive shaft linked to drive wheels, said motor control apparatus comprising:
- a skid detection module that detects a skid due to wheel spin of the drive wheels;
- a torque restriction control module that, in response to detection of a skid by said skid detection module, sets torque restriction for reduction of the skid and controls said motor under the torque restriction; and
- a torque restriction cancellation control module that, in response to at least a reducing tendency of the skid, cancels the torque restriction, which is set by said torque restriction control module, to a specific degree corresponding to a variation in a driver's accelerator operation, and controls said motor under at least partly cancelled torque restriction,
- wherein the variation in driver's accelerator operation represents a rate of change relative to a reference accelerator operation at a time of detection of a skid by said skid detection module.

11. A motor control method that controls a motor, which is mounted on a vehicle and outputs power to a drive shaft linked to drive wheels, said motor control method comprising the steps of:
- (a) detecting a skid due to wheelspin of the drive wheels;
- (b) in response to detection of a skid by said step (a), setting torque restriction for reduction of the skid and controlling said motor under the torque restriction; and
- (c) in response to at least a reducing tendency of the skid, canceling the torque restriction, which is set by said step (b), to a specific degree corresponding to a variation in a driver's accelerator operation, and controlling said motor under at least partly cancelled torque restriction, wherein the variation in driver's accelerator operation represents a rate of change relative to a reference accelerator operation at a time of detection of a skid by said step (a).

12. A motor control method in accordance with claim 11, wherein said step (c) cancels the torque restriction in a stepwise manner with elapse of time.

13. A motor control method in accordance with claim 12, wherein said step (c) controls the motor with a tendency of increasing a cancellation rate of the torque restriction with an increase in driver's additional depression of an accelerator pedal as the variation in driver's accelerator operation.

14. A motor control method in accordance with claim 12, wherein said step (c) controls the motor with a tendency of shortening a cancellation time of the torque restriction with an increase in driver's additional depression of an accelerator pedal as the variation in driver s accelerator operation.

15. A motor control apparatus in accordance with claim 3, wherein said torque restriction cancellation control module controls the motor with a tendency of shortening a cancellation time of the torque restriction with an increase in driver's additional depression of an accelerator pedal as the variation in driver's accelerator operation.

16. A motor control method in accordance with claim 13, wherein said step (c) controls the motor with a tendency of shortening a cancellation time of the torque restriction with an increase in driver's additional depression of an accelerator pedal as the variation in driver's accelerator operation.

* * * * *